Nov. 30, 1965 H. P. KAMIDE 3,221,141
ELECTRIC HEATING SYSTEMS AND CONTROLS THEREFOR
Filed Sept. 19, 1963 5 Sheets-Sheet 1

INVENTOR.
Harris P. Kamide
BY
Prangley, Baird, Clayton,
Miller & Vogel,
Attys.

INVENTOR.
Harris P. Kamide.

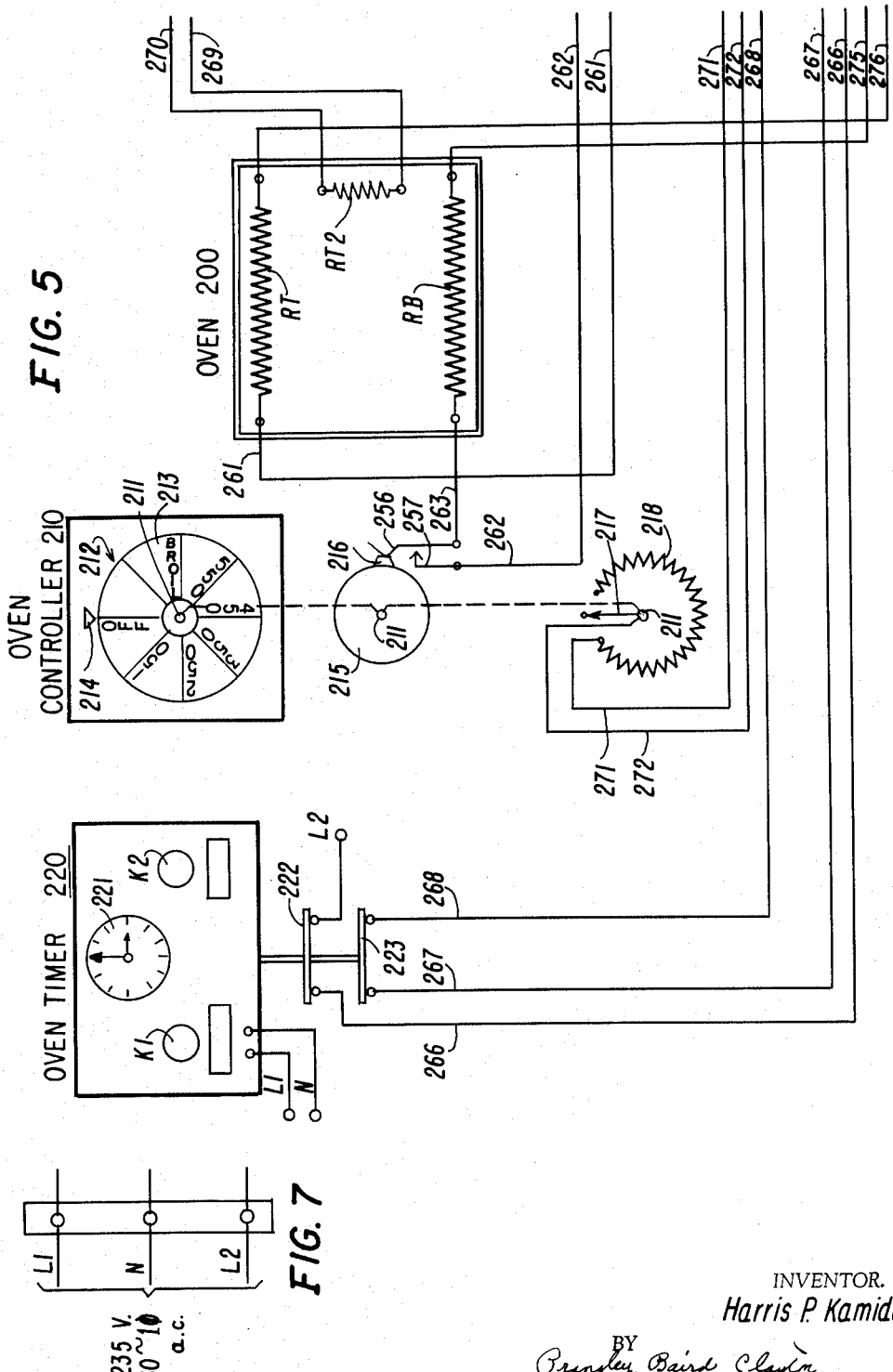

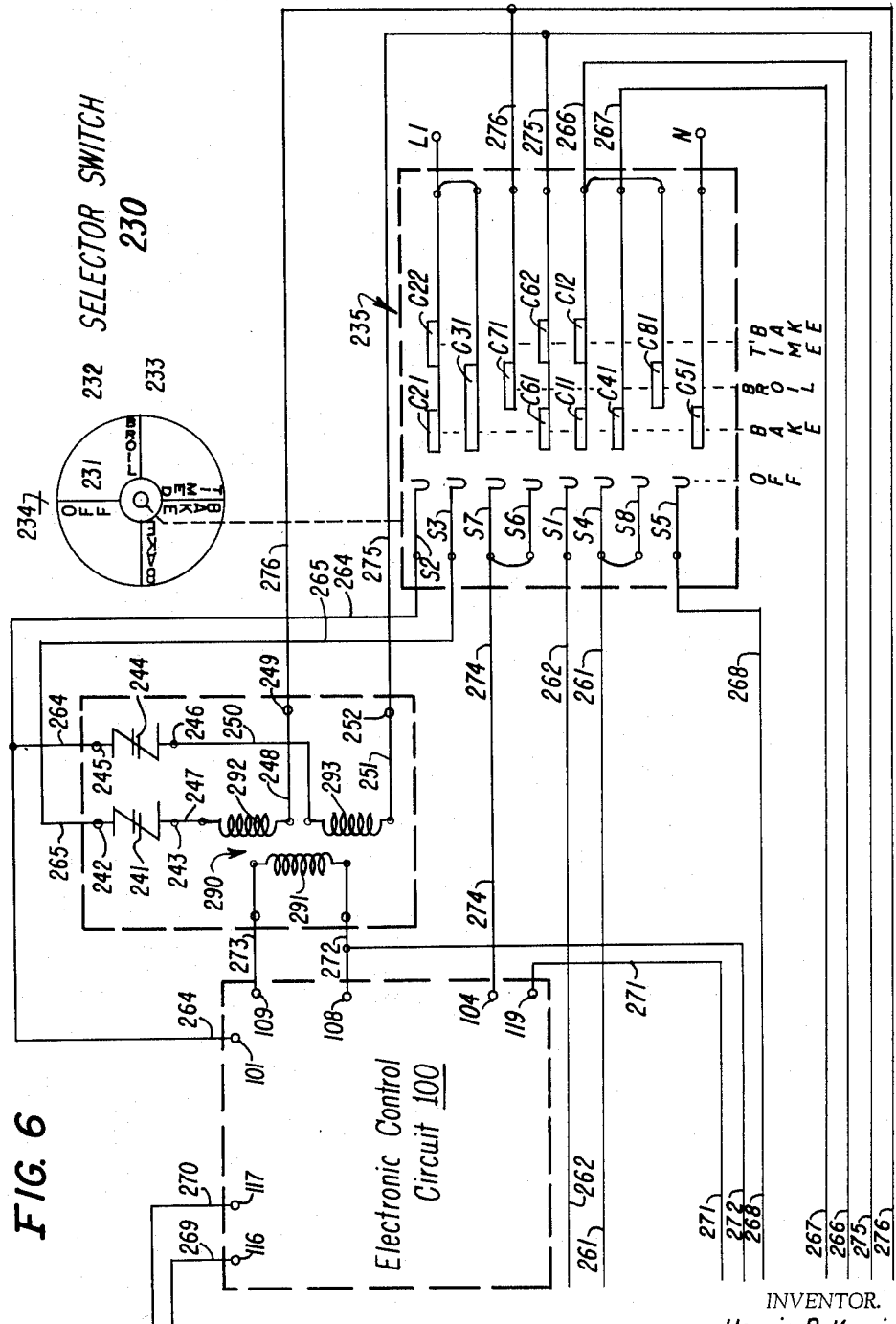

United States Patent Office 3,221,141
Patented Nov. 30, 1965

3,221,141
ELECTRIC HEATING SYSTEMS AND
CONTROLS THEREFOR
Harris P. Kamide, Franklin Park, Ill., assignor to General
Electric Company, a corporation of New York
Filed Sept. 19, 1963, Ser. No. 309,994
22 Claims. (Cl. 219—413)

The present invention relates to electric heating systems, and particularly to improved automatic control systems therefor.

It is a general object of the present invention to provide an improved heating system of the type including a temperature sensing unit arranged to sense the temperature of the medium heated by the heating system and a manually operable controlled selectively operative to set different desired temperatures of the medium heated by the heating system, and particularly to provide an improved automatic temperature control circuit therefor.

Another object of the invention is to provide an improved electrical control circuit for electric heating systems of the type set forth, wherein the control circuit comprises a circuit network of simple and economical connection and arrangement involving a minimum number of individual circuit elements and which requires no thermionic tubes or other elements which must be replaced during the normal life of the system.

In connection with the foregoing object, it is another object of the invention to provide an improved heating system of the type set forth incorporating therein an improved electrical control circuit that incorporates no moving parts except the manually adjustable temperature controller.

Still another of the invention is to provide an improved heating system of the type set forth including an improved electrical control circuit therefor, the control circuit operating to regulate the power provided to the heating unit as demanded, power being continuously provided to the heating unit when required and being infinitely variable from full powered input to zero power input upon demand.

A further object of the invention is to provide an improved electric oven having upper and lower heating units and a temperature sensing unit arranged to sense the temperature in the oven and a manually operable controller selectively operative to set different desired temperatures in the oven and a manually settable oven selector having the usual "bake" position and "broil" position and "timed bake" position, the oven including an improved electrical control system for regulating the flow of current to the heating units in accordance with the temperature sensed by the temperature sensing unit and the setting of the manually operable controller, current being continuously provided to the heating units when required and being infinitely variable from full current input to zero current input upon demand.

A still further object of the invention is to provide an improved heating system of the type set forth wherein the flow of current to the heating unit forming a part of the heating system is controlled by a solid state avalanche voltage break-down device characterized by a normally high impedance between the power terminals thereof and a consequent non-conductive state and also characterized by a low impedance between the power terminals thereof and a consequent non-conductive state in response to the application of a predetermined avalanche voltage across its power terminals and further characterized by a return to high impedance between its power terminals and a consequent non-conductive state in response to interruption of conduction between the power terminals thereof.

Further features of the invention pertain to the particular arrangement of the elements of the electric heating system including the heating unit and the associated control circuit therefor, whereby the above-outlined and additional operating features thereof are attained.

The invention, both as to its organization and method of operation, together with further objects and advantages thereof, will best be understood by reference to the following specification taken in connection with the accompanying drawings, in which.

FIGS. 5 and 6 taken together are a schematic circuit diagram illustrating the electrical control circuit of the present invention for controlling the operation of the heating units in the oven of the electric range; and FIG. 7 is a schematic illustration of the source of electric power for the control circuit of FIGS. 5 and 6.

Figure 1:
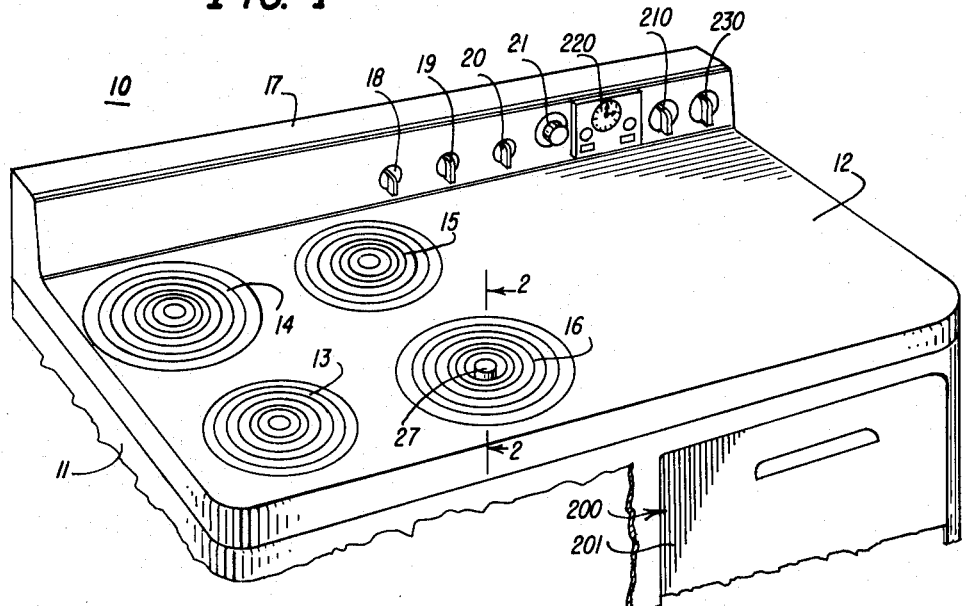
FIGURE 1 is a fragmentary front perspective view of the upper portion of an electric range incorporating therein a surface heating unit embodying the present invention and an oven embodying the present invention.

Referring now to FIG. 1 of the drawings, there is illustrated an electric range 10 incorporating electric heating apparatus embodying the features of the present invention and comprising an upstanding body 11 provided with a substantially horizontally disposed cooking top 12 supporting a plurality of surface heating units or hotplates 13, 14, 15 and 16 arranged in spaced-apart relationship in a substantially rectangular pattern on the lefthand side thereof; the body 11 houses an oven 200 in the righthand portion thereof provided with a door 201, and a compartment, not shown, in the lefthand portion thereof, the compartment also being provided with a front door, not shown. The cooking top 12 carries an upstanding backsplash 17 adjacent to the rear thereof that in turn carries a plurality of surface heating unit selector switches 18, 19 and 20, a range control switch 21, an oven controller 210, an oven timer 220 and an oven selector switch 230, the elements 18 to 21, 220, 210 and 230 being arranged in a row on the righthand side of the backsplash 17. The selector switches 18, 19 and 20, respectively, correspond to the surface heating units 13, 14 and 15, are of conventional construction, and are respectively included in the electric heating circuits thereof; while the control switch 21 corresponds to the surface heating unit 16 of special construction and is included in the electric heating circuit thereof; and while the oven controller 210 and the oven timer 220 and the selector switch 230 correspond to the oven 200 and are included in the electric heating circuit thereof. Each of the surface heating unit selector switches 18, 19 and 20 is of conventional construction and arrangement.

Figure 2:
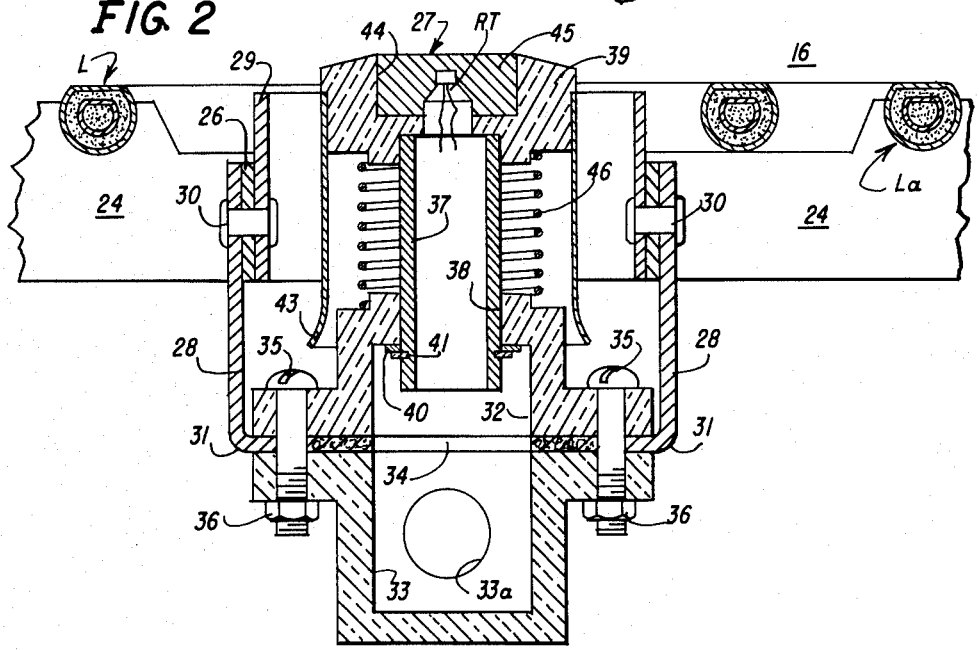
FIG. 2 is a greatly enlarged fragmentary vertical sectional view of one of the electric heating units or hotplates incorporated in the electric range taken in the direction of the arrows along the line 2—2 of FIG. 1 and illustrating the construction of the temperature sensing unit incorporated therein and forming a part of the electrical control circuit.

The cooking top 12 has a plurality of openings therein that respectively receive the electric heating units 13, 14, 15 and 16; and each of the electric heating units 13, 14 and 15 may be fundamentally of a construction disclosed in U.S. Patent No. 2,565,443, granted on August 21, 1951, to Oliver G. Vogel and Francis E. Kirk; while the surface heating unit 16 is of the special construction disclosed in U.S. Patent No. 2,822,455, granted on February 4, 1958, to Robert J. Molyneaux and Kenneth H. Walkoe. The surface heating unit 16 is of the hotplate type and is mounted for pivotal movements in the associated opening provided in the cooking top 12 by mechanism, not shown, that is preferably of the construction of that disclosed in U.S. Patent No. 2,565,432, granted on August 21, 1951, to Francis E. Kirk. More particularly, and referring to FIG. 2, the heating unit 16 comprises a spider 24 carrying a heating element L including respective inner and outer sections La and Lb, only a portion of the inner section La being illustrated. The heating element L is generally in the form of a helical coil or spiral, the turns of which are arranged in radially spaced-apart relation; and preferably, the heating element L is of the metal sheath-helical resistance conductor type disclosed in U.S. Patent No. 1,367,341, granted on February 1, 1921, to Charles C. Abbott. The spider 24 comprises a substantially centrally disposed upstanding ring 26, the coils of the heating element L being selectively staked to the arms of the spider 24 in the general manner disclosed in the Vogel and Kirk patent mentioned. The top surface of the coils of the heating element L are flattened to define a substantially horizontal plane adapted to engage and to support the bottom wall of a cooking vessel, or the like, not shown.

The hotplate 16 carries a temperature sensing unit 27 within the central ring 26 that is adapted to engage the bottom wall of the cooking vessel supported upon the heating element L; more particularly, a pair of opposed dependent arms 28 is arranged exteriorly of the central ring 26, and an upstanding tubular heat shield 29 is arranged interiorly of the central ring 26, the arms 28 and the heat shield 29 being retained in place by a pair of rivets 30. The arms 28 terminate inwardly directed flanges 31 disposed below the central ring 26 that carry upper and lower substantially cup-shaped housings 32 and 33 formed of lava or the like. The upper housing 32 is arranged in inverted position and constitutes a supporting base, the housings 32 and 33 being retained in place upon the flanges 31, with an asbestos ring 34 clamped therebetween, by removable screws 35 provided with cooperating nuts 36. An upstanding tubular member 37 is slidably mounted in a cooperating opening 38 provided in the top of the housing 32, the upper end of the tubular member 37 carrying an insulating ring 39 formed of lava, or the like, and arranged within the heat shield 29 in spaced relationship with respect thereto. The tubular member 37 is retained in place by an arrangement including a surrounding washer 40 and a cooperating lock ring 41 carried on the lower end of the member 37 and cooperating with the inner surface of the top of the housing 32 adjacent to the opening 38. The ring 39, in turn, carries a dependent tubular heat shield 42 of general skirt-like structure that is spaced inwardly with respect to the cooperating heat shield 29, the extreme lower end of the heat shield 42 being outwardly flared, as indicated at 43, so that it covers the top of the housing 32. A center cavity 44 is formed in the top of the ring 39 and carries a sensing button 45 formed of aluminum, or the like.

In the arrangement, the heat shields 29 and 42, as well as the member 37 are preferably formed of stainless steel or other bright and reflective material; while the sensing button 45 is formed of aluminum, or the like, as previously noted, so that it constitutes a good heat conductor capable of following closely the temperature of the bottom wall of a cooking vessel supported by the heating element L. The tubular member 37, the ring 39, the heat shield 42 and the sensing button 45 are movable as a unit with respect to the base 32, by virtue of an arrangement of a coil spring 46 surrounding the tubular member 37 and disposed between the top of the housing 32 and the bottom of the ring 39. More particularly, the coil spring 46 normally biases the parts 37, 39, 42 and 45 upwardly with respect to the housing 32; whereby the top surface of the sensing button 45 is normally disposed slightly above the substantially horizontal plane of the flattened top surface of the heating element L. However, when a cooking vessel is placed upon the heating element L, the bottom wall thereof engages the top surface of the sensing button 45 moving the elements 37, 39, 42 and 45 downwardly with respect to the housing 32 against the bias of the coil spring 46; whereby the top surface of the sensing button 45 is urged into good thermal contact with the bottom wall of the supported cooking vessel by the coil spring 46.

A temperature sensing resistor RT1 is arranged in a cooperating centrally disposed cavity formed in the lower surface of the sensing button 45. The temperature sensing resistor RT1 is, of course, movable with the sensing button 45 and is arranged in good heat exchange relation therewith, for a purpose more fully explained hereinafter, the temperature sensing resistor RT1 being included in an external electric circuit, described more fully hereinafter, the connecting conductors extending through the tubular element 37 and through a hole 33a provided in the housing 33. Since the conductors mentioned are subject to a rather high temperature, they are preferably formed of silver, or the like, and are preferably covered with an insulating material capable of withstanding the relatively high temperature mentioned, such for example, as polytetrafluoroethylene, sold as "Teflon." The sensing resistor TR1 is formed of material having a high negative temperature coefficient of resistance, such for example, as the ceramic-like material consisting of sintered aluminum oxide, and an oxide of magnesium, manganese, titanium, iron, nickel, cobalt, zinc, etc., and known as "Thermistor" material. For example, the resistor RT1 may have the exceedingly high temperature coefficient of resistance corresponding to a resistance rate change of −0.044 ohm/ohm/° C.

Figure 3:
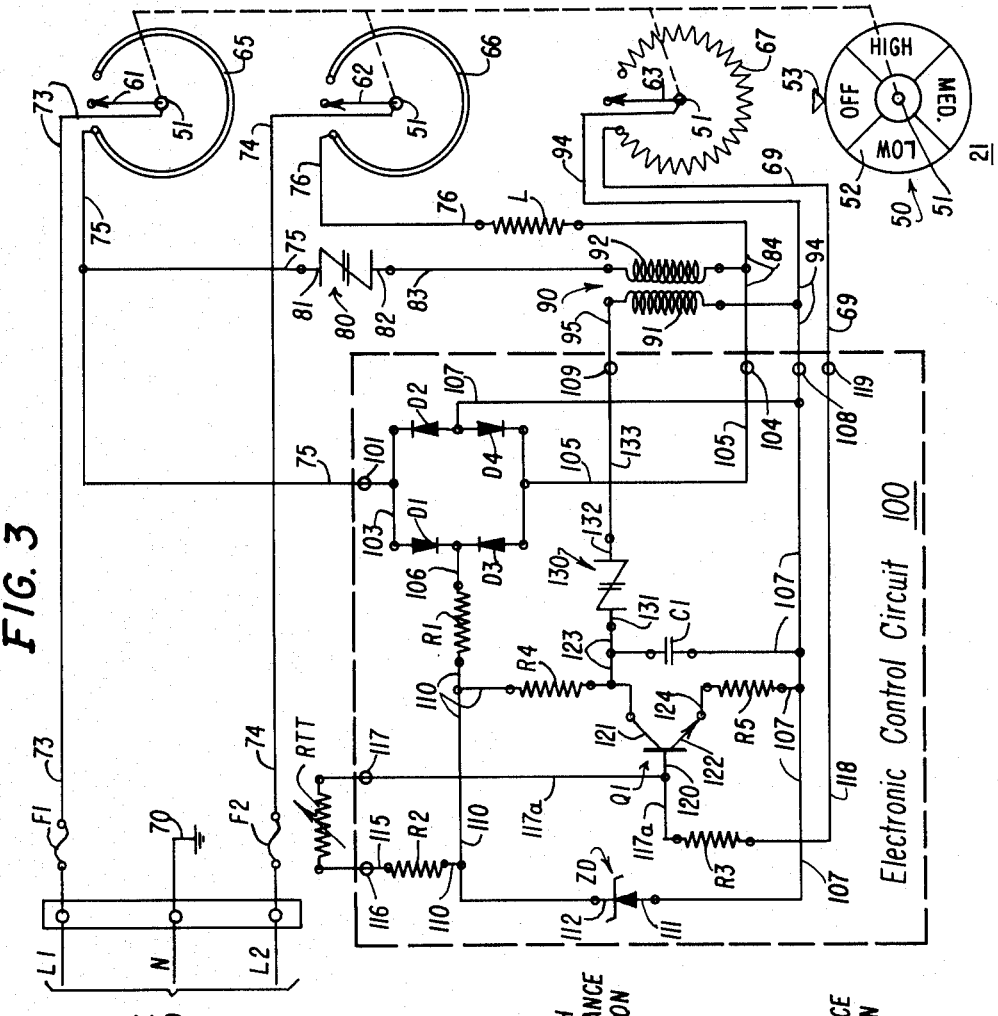
FIG. 3 is a schematic diagram of the electrical control circuit for the heating unit or hotplate incorporating the temperature sensing unit shown in FIG. 2.

Referring now to FIG. 3, the manually operable control switch 21 carried by the backsplash 17 and individually associated with the hotplate 16 comprises a knob 50 mounted on the outer end of a rotatably mounted operating shaft 51, the knob 50 having a skirt provided with indicia 52 thereon cooperating with an index marker 53 carried by the backsplash 17. More particularly, the control switch 21 comprises "off," "low," "medium" and "high" positions that correspond to respective portions of the indicia 52 carried by the manual knob 50 and cooperating with the index marker 53. In the arrangement, the indicia 52 correspond to temperatures of the cooking vessel supported by the hotplate 16; whereby the low range mentioned corresponds to the temperature range 120° F. to 220° F.; the medium range mentioned corresponds to the temperature range 220° F. to 320° F.; and the high range mentioned corresponds to the temperature range 320° F. to 420° F. Further, the rotatable shaft 51 of the control switch 21 carries three wipers 61, 62 and 63 that are simultaneously adjustable as the manual knob 50 is rotated. The wipers 61 and 62, respectively, comprise portions of switches respectively including cooperating conducting segments 65 and 66; and the wiper 63 comprises a portion of a variable resistor including a resistance element 67.

Also the circuit network comprises a three-wire Edison source of power supply of 236 volts, single-phase A.-C. including two outside lines 71 and 72 and a grounded neutral line 70, the outside lines 71 and 72 being respectively connected through fuses F1 and F2 to conductors 73 and 74 connected to the wipers 61 and 62, respectively. The conducting segments 65 and 66, respectively, terminate two conductors 75 and 76; the wiper 63 terminates the conductor 94 and one end of the resistor 67 terminates the conductor 69. In the arrangement, when the manual dial 50 occupies its "off" position, the wipers 61 and 62, respectively, disengage the cooperating conductnected to the conductor 107 and the other terminal thereof connected to the conductor 123, the effective impedance in the charging path for and the effective charging potential of the capacitor C1 being controlled by the transistor Q1 and more particularly by the potential on the base 120 thereof.

The voltage developed across the capacitor C1 is applied to a second solid state avalanche voltage break-down device 130 having power terminals 131 and 132, the power terminal 131 being connected to the conductor 123 and the power terminal 132 being connected by a conductor 133 to an output terminal 109 for the control circuit 100. More particularly, the output from the control circuit 100 is a voltage pulse developed by the conduction of the break-down device 130 and appears between the terminals 108 and 109, the terminals 108 and 109 being respectively connected by conductors 94 and 95 to the input terminals for the primary winding 91 of the pulse transformer 90. The solid state avalanche voltage break-down device 130 is of the same type and character as the device 80 but is characterized by conduction upon the application of an avalanche voltage of 40 volts across the power terminals 131 and 132 thereof.

Now assuming that the cook wishes to carry out a medium temperature cooking operation upon the hotplate 16 and that the heating element L thereof is cool, the cook places the cooking vessel and its contents in a supported position on the top surface of the heating element L, whereby the bottom wall of the cooking vessel engages the sensing button 45 and moves the temperature sensing unit 27 into its depressed position so that the sensing button 45 is in good thermal contact with the bottom of the cooking vessel. At this time the thermistor RT1 is cool so that it has the exceedingly high resistance previously noted. Finally, the cook rotates the manual dial 50 in the clockwise direction from its "off" position to its "medium" position whereby the wipers 61 and 62 engage the conducting segments 65 and 66, respectively, so as to complete a circuit from the conductor 75 through the breakdown device 80, the conductor 83, the secondary winding 92 of the pulse transformer 90 and the conductor 84 to one terminal of the heating unit L; and from the other terminal of the heating unit L to the conductor 76.

There also is completed a circuit for operating the rectifying network 102 by applying the potential on conductors 75 and 84 through the terminals 101 and 104, respectively, to the conductors 103 and 105, respectively. The output potential from the rectifying network 102 appearing on the conductors 106 and 107 is applied through the resistor R1 to the diode ZD and the clipped rectified fullwave D.-C. voltage is impressed again across the voltage divider network including the resistor R2, the resistor RT1, the resistor R3 and that portion of the resistor 67 between the wiper 63 and the conductor 69, i.e., about one-half of the resistance of the resistor 67 with the manual dial 50 in the "medium" position thereof. Since the resistor RT1 has an exceedingly high resistance value when cold, the potential on the conductor 117a that is applied to the base 120 of the transistor Q1 will be relatively high, i.e., toward the potential on the conductor 107, and the transistor Q1 conducts heavily and the capacitor C1 quickly charges to a potential such as to apply to the terminals 131 and 132 of the break-down device 130 the avalanche voltage therefor. When the break-down device 130 has the avalanche voltage applied to the power terminals 131 and 132 thereof, it becomes highly conductive and exhibits very small impedance so as to discharge the capacitor C1 through the device 130 and the primary winding 91 of the pulse transformer 90. The surge of current through the primary winding 91 causes a high potential pulse to be generated in the secondary winding 92 of the pulse transformer 90 which is immediately applied to the power terminals 81 and 82 of the break-down device 80, causing the avalanche voltage to appear thereacross and rendering the device 80 highly conductive so that it exhibits little or substantially no impedance to the flow of current therethrough in either direction; accordingly, current is conducted through the device 80 and the secondary winding 92 of the pulse transformer 90 and the heating unit L in accordance with the potential between the conductors 75 and 76 as soon as the avalanche voltage is applied to the device 80. The break-down device 80 continues to conduct until the current flowing therethrough has a zero amplitude at which time the device 80 becomes non-conductive and presents a high impedance effectively blocking subsequent current flow therethrough until the avalanche voltage is again applied thereto, the passing of each power half cycle through the zero potential point thereof effectively stopping the flow of current through the device 80 to render it again non-conductive.

As soon as the capacitor C1 has fully discharged in the electronic control circuit 100, the current flowing through the break-down device 130 will cease and the device 130 will accordingly again become non-conductive and will impose a high impedance in the discharge path of the capacitor C1. At the next half cycle of the power source, another control signal will be generated by the circuit 100 by first charging the capacitor C1 by the conduction of the transistor Q1 until the avalanche voltage of the break-down device 130 is reached, at which time the device 130 will become highly conductive so as to discharge the capacitor C1 through the discharge path thereof which includes the device 130 and the primary winding 91 of the pulse transformer 90 in series with each other. It will be seen therefore that during both the positive-going half cycles of the potential on the conductors 75 and 76 and the negative-going power half cycles of the potential on the conductors 75 and 76 a control signal will be produced by the control circuit 100 and applied to the pulse transformer 90 which in turn will operate to produce an avalanche voltage across the power terminals of the breakdown device 80 to permit conduction therethrough and through the heating unit L to cause heating thereof.

At the beginning of a new heating operation at which time the sensing button 45 and resistor RT1 are cold so that the resistor RT1 has an exceedingly high resistance value, the capacitor C1 will be charged substantially immediately to the avalanche voltage of the break-down device 130 so that the device 80 is rendered conductive substantially at the beginning of each power half cycle. As the heating unit L is operated to heat the cooking vessel and its contents in contact with the sensing button 45, the resistance of the resistor RT1 decreases so as to drop or lower the potential on the base 120 of the transistor Q1 and thus to reduce the conduction therethrough and, accordingly, to provide a smaller charging current for the capacitor C1. The capacitor C1 will therefore charge the avalanche voltage of the break-down device 130 later in each power half cycle and the device 80 will, accordingly, be rendered conductive later in each power half cycle so as to supply less heating current to the heating unit L. When the cooking vessel in contact with the sensing button 45 reaches the temperature set by the manual dial 50, the transistor Q1 will have such a low bias on the base 120 thereof that it will conduct very little current to charge the capacitor C1 which in turn will reach the avalanche voltage of the break-down device 130 late in each power half cycle so as to render the device 80 conductive late in each power half cycle so as to supply only a very small amount of current to the heating unit L, the amount of current supplied being just that necessary to maintain the temperature of the cooking vessel upon the hotplate 16 at the temperature setting of the manual dial 50.

Figure 4:
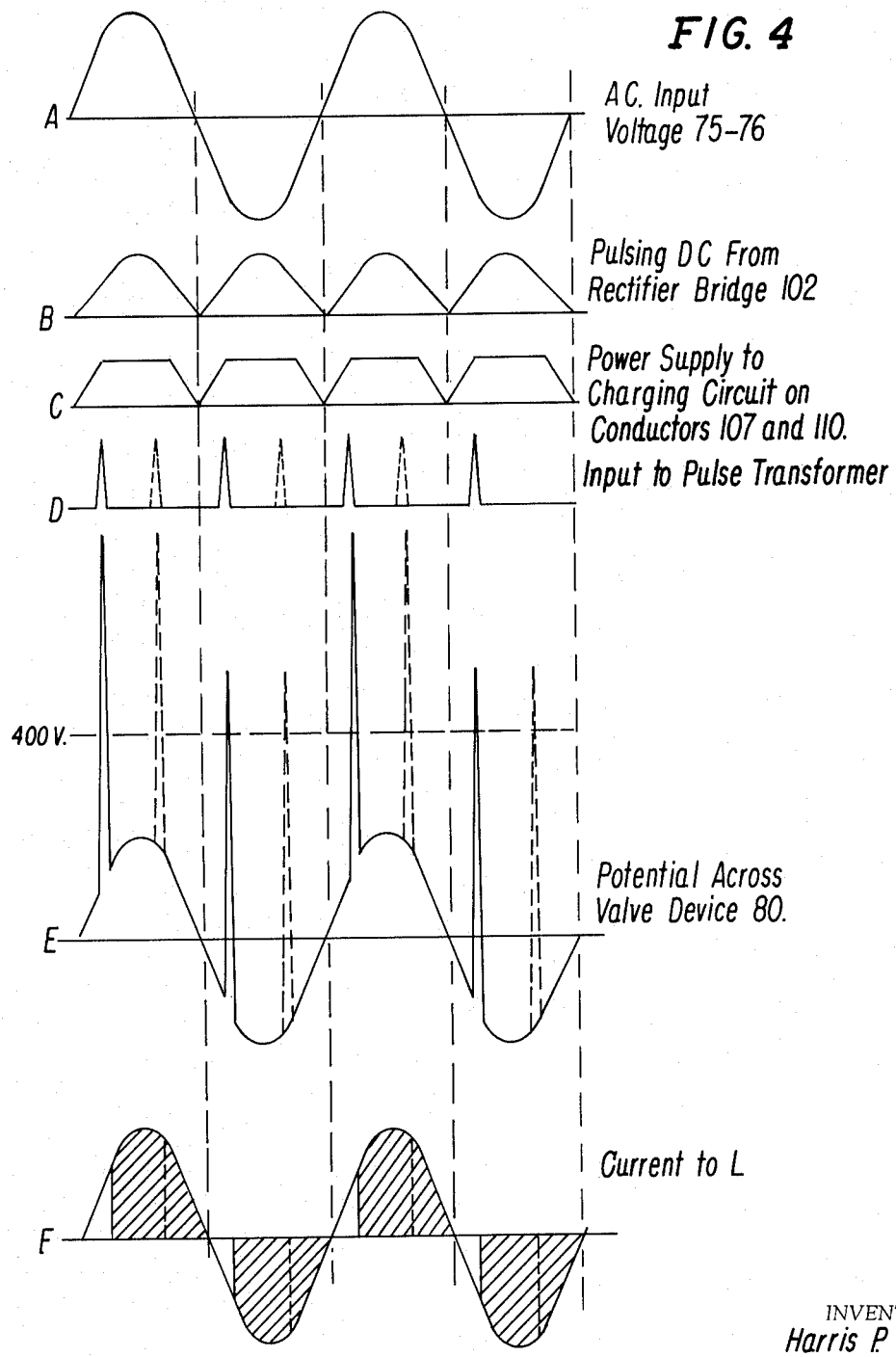
FIG. 4 is a graphic illustration of the voltages obtained at different points in the circuit of FIG. 3 during the operation thereof and illustrating particularly the phase relationships among the voltages.

There is graphically illustrated in FIG. 4 of the drawings the voltages appearing at various places in the circuit and illustrating particularly the phase relationship of the various voltages. FIG. 4A illustrates the A.-C. input voltage appearing on the conductors 75 and 76, this voltage being applied to the power circuit including in ing segments 65 and 66 and the wiper 63 disengages the resistor 67. When the manual dial 50 is rotated in a clockwise direction out of its "off" position about 10°, the wipers 61 and 62, respectively, engage the conducting segments 65 and 66 and the wiper 63 engages the resistor 67. As the manual dial 50 is rotated further in the clockwise direction to the low range and through its medium range and into its high range, the wipers 61 and 62 remain in engagement with the respective conducting segments 65 and 66 and the wiper 63 is moved toward the end thereof terminating the conductor 69 so as progressively to decrease the portion of the resistance of the resistor 67 between the conductors 69 and 94.

The circuit network further comprises a solid state avalanche voltage break-down device 80 having a pair of power terminates 81 and 82, the power terminal 81 being connected to the conductor 75 and the power terminal 82 being connected to a conductor 83; there further is provided a pulse transformer 90 having a primary winding 91 and a secondary winding 92, one terminal of the secondary winding 92 being connected to the conductor 83 and the other terminal of the secondary winding 92 being connected by a conductor 84 to one terminal of the heating unit L, the other terminal of the heating unit L being connected to the conductor 76. Accordingly, it will be seen that the break-down device 80 and the secondary winding 92 of the pulse transformer 90 and the heating element L are connected in series circuit with each other and across the main power conductors 75 and 76.

The solid state avalanche voltage break-down device 80 comprises five rectifying layers between the power terminals 81 and 82 thereof and is characterized by a normally high impedance between the power terminals thereof and a consequent non-conductive state. Upon the application of a predetermined avalanche voltage, for example 400 volts, across the power terminals 81 and 82, the break-down device 80 is characterized by a low impedance and a consequent conductive state wherein it will conduct current in either direction therethrough and between the power terminals 81 and 82 thereof; furthermore, the avalanch voltage applied across the terminals 81 and 82 to create the conductive state thereof may be of either polarity and once rendered conductive the device 80 will conduct in either direction regardless of the polarity of the availanche voltage which rendered it conductive. Furthermore, the break-down device 80 will continue to exhibit a low impedance and conduct current therethrough even when the voltage across the power terminals 81 and 82 falls to a low value and in fact the device 80 will continue to conduct until interruption of conduction between its power terminals, whereupon the device 80 returns to its norml high impedance and a consequent non-conductive state.

For example, the solid state avalanche voltage break-down device 80 may be of the construction and arrangement of that sold commercially by the Hunt Electronics Co.

In the circuit illustrated in FIG. 3, the current to the heating unit L is controlled by the state of conduction of the break-down device 80 and the state of conduction of the device 80 is in turn controlled by the potential applied across its power terminals 81 and 82 from the secondary winding 92 of the pulse transformer 90. More particularly, if the break-down device 80 is rendered conductive at the beginning of each power half cycle of the supply conductors 75 and 76, full line potential will be applied across the conductor L for the full extent of each power half cycle. On the other hand, if the break-down device 80 is rendered conductive after the beginning of each power half cycle, then the heating unit L will have less than full line power developed thereacross, it being understood that the device 80 is rendered normally non-conductive each time that the current ceases to flow therethrough, i.e., each time that the voltage on the conductors 75 and 76 passes through the zero value thereof. Accordingly, the power supplied to the heating unit L and consequently the heat developed thereby can be controlled by means of the break-down device 80, and more particularly by rendering the device 80 conductive either early in the power half cycles to supply high power or late in each power half cycle to supply low power or any desired value therebetween.

The circuit for supplying the control signals to the pulse transformer 90 in order to generate the avalanche voltage across the break-down device 80 is generally designated by the numeral 100 and includes a first terminal 101 that is connected to the line conductor 75. The terminal 101 is in turn connected to provide operating potential to a fullwave rectifying network 102 including silicon diodes D1, D2, D3 and D4 arranged in the usual fullwave rectifying net between input conductors 103 and 105, the input conductor 103 being connected to the terminal 101 and the input conductor 105 being connected to an input terminal 104 that is also connected to the conductor 84 which connects through the heating unit L with the line conductor 76. The output from the rectifying network 102 is a fullwave rectified D.-C. voltage appearing on conductors 106 and 107; the conductor 106 is also connected to one terminal of the resistor R1 which has the other terminal thereof connected to a conductor 110. The potential between the conductors 107 and 110 is applied across a Zener diode ZD having power terminals 111 and 112 connected respectively to the conductors 107 and 110. The Zener diode ZD is characterized by conduction when a voltage of a predetermined magnitude is applied across the power terminals 111 and 112 thereof, such for example as 60 volts, and serves thereafter to maintain the voltage across the power terminals 111 and 112 at the predetermined value, so as to provide a clipped fullwave rectified D.-C. voltage of constant amplitude between the conductors 107 and 110.

The clipped D.-C. voltage from the Zener diode ZD appearing on the conductors 107 and 110 is applied across a voltage divider network including the temperature sensing resistor RT1 and the control resistor 67. More specifically, a connection is made from the conductor 110 to one terminal of a resistor R2, the other terminal of the resistor R2 being connected by a conductor 115 to an input terminal 116 for the control circuit 100, the terminal 116 being connected to one terminal of the resistor RT1. Another input terminal 117 is provided for the control circuit 100 and is connected to the other end of the resistor RT1, the terminal 117 also being connected to a conductor 117a connected to one terminal of a resistor R3, the other terminal of the resistor R3 being connected by a resistor 118 to another input terminal 119 for the control circuit 100. The input terminal 119 further is connecter by the conductor 69 to one terminal of the resistor 67 and more particularly that portion of the resistor 67 between the conductor 69 and the wiper 63. The wiper 63 is connected by the conductor 94 to a terminal 108 for the control circuit 100, the terminal 108 also being connected to the conductor 107. Accordingly, the resistors R2, RT1, R3, and the portion of the resistor 67 between the wiper 63 and the conductor 69 are connected in series with each other and across the conductors 107 and 110.

The potential in the voltage divider network appearing on the conductor 117a is applied as one of the inputs to a transistor Q1, the transistor Q1 having the usual base electrode 120, collector electrode 121 and emitter electrode 122, the base 120 being connected to the conductor 117a. The collector electrode 121 is connected by a conductor 123 to one terminal of a resistor R4 which has the other terminal thereof connected to the conductor 110. The emitter 122 is connected by a conductor 124 to one terminal of a resistor R5 having the other terminal thereof connected to the conductor 107. A charging capacitor C1 is also provided having one terminal thereof conseries the break-down device 80 and the secondary winding 92 of the pulse transformer 90 and the heating unit L. The input voltage of FIG. 4A is also applied as the input to the rectifying network 102, the voltage illustrated in FIG. 4B being that obtained as an output from the network 102 on the conductors 106 and 107. The voltage illustrated in FIG. 4B is clipped by the diode ZD to produce the voltage diagrammatically illustrated in FIG. 4C which appears between the conductors 107 and 110. As a result of the charging of the capacitor C1 through the transistor Q1 under the control of the thermistor RT1 and the setting of the manual dial 50 and the subsequent discharge of the capacitor C1 through the primary winding 91 of the pulse transformer 90, there is applied as an input to the primary winding 91 of the pulse transformer 90 a sharp pulse of voltage diagrammatically illustrated in FIG. 4D for each power half cycle of the input voltage illustrated in FIG. 4A. The voltage peak applied to the primary winding 91 is stepped up by transformer action in the pulse transformer 90 to provide between the output terminals of the secondary winding 92 of the pulse transformer 90 a high potential pulse which preferably has a value of several hundred voltages, this potential being algebraically added to the potential between the conductor 75 and 76 to provide an avalanche voltage on potential across the power terminals 81 and 82 of the break-down device 80 which is illustrated in FIG. 4E of the drawings. It will be noted that on the positive-going half cycles of the input voltage of FIG. 4A, the high pulse potential from the transformer 90 is added to the input voltage so that the resultant voltage substantially exceeds the avalanche voltage of 400 volts for the break-down device 80 which is illustrated by the horizontal dashed lines in FIG. 4E. On the other hand, during the negative-going half cycles of the input voltage of FIG. 4A, the input voltage is actually subtracted from the output voltage from the transformer 90 but it is noted that the resulting potential is still greater than 400 volts so as to insure that the proper avalanche voltage is applied across the terminals of the break-down device 80. It is to be understood that the avalanche voltage instead of being positive-going as illustrated in FIG. 4E may also be negative-going, and it further is noted that the direction of current flow through the break-down device 80 depends only upon the potential between the conductors 75 and 76 and is completely independent of the polarity of the avalanche voltage applied thereto to render the device 80 conductive. Finally, there is illustrated in FIG. 4F, a typical curve of the current flowing through the break-down device 80 and through the heating unit L to cause heating thereof, the current therethrough being that appearing subsequent to the pulses of FIGS. 4D and 4E and that more particularly illustrated by the shaded portions of FIG. 4F. It will be readily apparent that by shifting the phase of the pulses in FIGS. 4D and 4E with respect to the power input voltage of FIG. 4A, a greater or a lesser amount of current can be applied to the heating unit L during each power half cycle, the pulses illustrated by the dashed lines in FIGS. 4D and 4E resulting in the current flow depicted to the right of the vertical dashed lines in FIG. 4F of the drawings.

From the above explanation it will be seen that the phase relationship between the signal pulses or voltages in FIGS. 4D and 4E and the corresponding half cycles of the power input voltage of FIG. 4A is depending upon the charging rate of the capacitor C1 which in turn is dependent upon the potential or bias on the base 120 of the transistor Q1. The bias on the base 120 of the transistor Q1 is in turn determined jointly by the temperature sensed by the resistor RT1 and the setting of the manual dial 50, the temperature of the resistor RT1 being in turn determined by the temperature of the cooking vessel on the hotplate 16, and the setting of the manual dial 50 depending on the temperature selected by the cook at the beginning of a cooking operation. More specifically, the potential or bias on the base 120 of the transistor Q1 is a function of the temperature difference between the temperature sensed by the resistor RT1 and the temperature selected by the cook by means of a manual dial 50. A large temperature difference results in a substantial bias for the transistor Q1 which provides a fast charging time for the capacitor C1 thus causing early conduction of the break-down device 130 thereby to produce the pulses illustrated by solid lines in FIGS. 4D and 4E early in each cycle of the input voltage. As the temperature of the resistor RT1 approaches the temperature selected by the cook, the bias on the base 120 of the transistor Q1 is decreased so that the charging time of the capacitor C1 becomes longer and the valve device 130 is rendered conductive later in each half cycle of the input voltage, for example, the pulses illustrated by the dashed lines in FIGS. 4D and 4E, thereby to apply a lesser portion of the available current through the heating unit L. When the temperature of the resistor RT1 reaches that selected by the cook by means of the manual dial 50, the bias on the base 120 of the transistor Q1 is such that the capacitor C1 charges very slowly and either does not reach the avalanche voltage of the break-down device 130 before the end of each power half cycle or reaches the avalanche voltage very late in each power half cycle so as to apply no or little current through the device 80 to the heating unit L. The control system therefore upon demand for heat as determined by the voltage divider network including the resistors R2 and RT1 and R3 and 67 applies a portion of each power half cycle of the input current through the heating unit L, the portion of each half cycle applied varying from all of the half cycle to none thereof, the amount applied being proportional to the difference of the temperature sensed to the resistor RT1 and the temperature setting of the manual dial 50. As a result, there is a very smooth and continuous application of power when demanded, in the form of 120 pulses per second to the heating unit L, the amount of power applied being proportional to the power demand; as a consequence, there is substantially no overrun of the selected temperature or overheating of the heating unit L and the control of the heating unit L is continuously variable and accurate whereby to provide a precise control of the temperature of the cooking vessel on the hotplate 16.

In view of the above, it will be understood that the carrying out of cooking operations in the "low" position and the "high" position of the manual dial 50 is substantially identical to that described in connection with that in the "medium" position except that the manual dial 50 is rotated to the appropriate position, whereby correspondingly lower and higher temperatures are set for operation of the control circuit 100. Of course, it will be understood that at the conclusion of any cooking operation when the manual dial 50 is returned into its "off" position, the wipers 61 and 62, respectively, disengage the associated conducting segments 65 and 66 effecting de-energization of all of the circuit elements so that the heating unit L is disengaged from the three-wire Edison source.

Figure 3A:
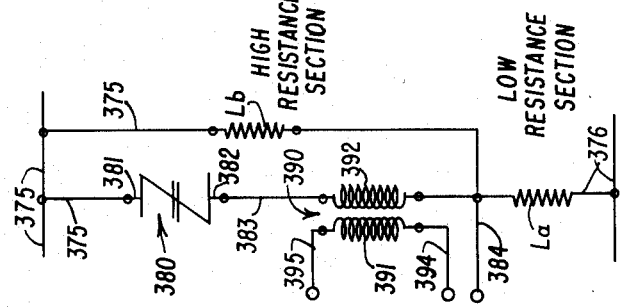
FIG. 3A is a simplified schematic diagram of a modification of the electrical control circuit illustrated in FIG. 3.

There is shown in FIG. 3A of the drawings a second preferred embodiment of a connection of the heating unit in the main power circuit. Whereas in the circuit of FIG. 3, the avalanche voltage break-down device 80 and the secondary winding 92 of the pulse transformer 90 and all of the resistance of the heating unit L are connected in series, it also is possible to control the current to a heating unit by placing it in parallel with the break-down device. In FIG. 3A like reference numerals have been used to designate like parts with the addition of the numeral "3" before each number so that all of the numbers in FIG. 3A are of the "300" series. More specifically, the full line voltage with the manual dial 50 out of its "off" position and into one of its operative positions is applied between the conductors 375 and 376. The conductor 375 is connected to a solid state avalanche voltage break-down device 380 identical to the break-down device 80 and more particularly to one of the power terminals 381 thereof, the other power terminal 382 being connected to a conductor 383. A pulse transformer 390 is provided having a primary winding 391 and a secondary winding 392, the terminals of the primary winding 391 being connected by conductors 394 and 395 to the output terminals 108 and 109, respectively, of the electronic control circuit 100. One terminal of the secondary winding 392 of the pulse transformer 390 is connected to the conductor 383 and the other terminal thereof is connected to a conductor 384.

As illustrated in FIG. 3A, the heating unit has the resistance thereof divided into two sections L$a$ and L$b$, the section L$a$ having a low resistance and being, for example, the inner resistance section of the heating unit for the hotplate 16, and the section L$b$ having a high resistance and being, for example, the outer resistant section of the heating unit for the hotplate 16. When the break-down device 380 has its normal high impedance and is in its non-conductive state, the potential appearing between the conductors 375 and 376 is divided across the heating unit sections L$a$ and L$b$ in accordance with the resistance thereof, whereby to supply one level of heating to the hotplate 16. Upon the application of the avalanche voltage from the pulse transformer 390 to the power terminals 381 and 382 of the break-down device 380, the device 380 has a low impedance and is highly conductive and forms essentially a short circuit around and in parallel with the resistance section L$b$ so that substantially all of the potential appearing between the conductors 375 and 376 is applied to the resistance section L$a$, whereby to provide another and higher level of heating therefrom; whereas the resistance section L$b$ is effectively shorted out and there is no contribution of heating therefrom. Accordingly, the break-down device 380 and the accompanying control circuits therefor including the pulse transformer 390 can be used to control the heating of the resistance section L$b$, although in a parallel rather than series arrangement therewith.

There is illustrated in FIGS. 5 to 7 of the drawings the application of the present invention to the control of the heating units in the oven 200 of the electric range 10. The oven 200 is diagrammatically illustrated in FIG. 5 and comprises an upstanding substantially box-like metal body or liner defining an oven cooking cavity therein, the liner typically comprising a rear wall, a top wall, a bottom wall and a pair of side walls. The interior surfaces of the oven 200 may be finished in any conventional manner, such for example, as by carrying a layer of porcelain enamel of the glass-frit type, not shown. The oven door 201 (see FIG. 1) closes the metal body and forms a sixth wall for the oven cooking cavity. An upper or broil electric heating unit RT is arranged in the upper portion of the oven 200 adjacent to the top wall thereof; and a lower or bake electric heating unit RB is arranged in the lower portion of the oven 200 adjacent to the bottom wall thereof. Also, the broil heating unit RT may be provided with the usual heat reflector (not shown) positioned thereabove and below the top wall of the oven 200, and the side walls may carry the usual tiers of horizontally aligned shelf supporting bosses (not shown), which bosses may support one or more movable shelves (not shown), in the oven 200 in the usual manner.

Further the oven 200 is provided with an electric control network as is schematically illustrated in FIGS. 5 and 6, the control network being powered from a suitable source of electric power illustrated in FIG. 7, the source of FIG. 7 comprising a three-wire Edison source of power supply of 236 volts, single phase, 60 cycles, A.-C. provided with a pair of outside line conductors L1 and L2 and a grounded neutral conductor N. Also, the control network includes a manually operable oven controller 210, a clock-controlled oven timer 220, a manually operable selector switch 230, and a power control circuit 240, all connected to the electronic control circuit 100 which has been described above with respect to the heating system of FIG. 3.

The oven controller 210 comprises a rotatable operating shaft 211 carrying a manually operable dial 212 on the outer end thereof, the dial 212 including a skirt carrying indicia that cooperate with an associated index marker 214, the skirt of the dial 212 carrying the indicia "off," "150," etc., "550" and "broil." The indicia "150," etc., refer to ° F.; whereby the normal cooking temperature range of the oven controller 210 embraces the range 150° F. to 550° F. the "broil" position of the manual dial 212 actually corresponds to a temperature setting of 600° F. to insure that the oven 200 is not overheated when the various circuit elements are in the "broil" position thereof. The operating shaft 211 further carries a cam 215 having a control cam surface 216 thereon which is operative to control the position of a switch 255 as will be described more fully hereinafter. There is further mounted upon the operating shaft 211 a wiper 217 which is adapted to engage a resistor 218 along an adjusted position thereof.

The oven timer 220 comprises a clock 221 of the synchronous motor type, preferably a "Telechron," a "time-to-stop" manually settable knob K1 and a "cooking time" manually settable knob K2 of the usual form and including a "manual" position and a plurality of "cooking time" positions. The oven timer 220 further includes the usual switch contacts 222 and 223 which are operated from a normally closed position illustrated in FIG. 5 to an actuated position opening the switch contacts 222 and 223 upon the setting of the control knobs K1 and K2; more specifically, when the oven timer 220 is set by moving the knob K1 to a selected time and by moving the knob K2 out of its "manual" position, the switch contacts 222 and 223 are opened and remain in this position until the clock time set by the knob K2 and preceding clock time-to-stop set by the knob K1, at which time the contacts 222 and 223 are closed; the contacts 222 and 223 remain in this position until the clock time-to-stop as set by the knob K1 at which time the contacts 222 and 223 are re-opened, the contacts remaining in the open or actuated position until the knob K2 is returned to its "manual" position.

The oven selector switch 230 comprises a rotatable operating shaft 231 carrying a manually operable dial 232 on the outer end thereof and a switch drum 235 on the inner end thereof. The dial 232 comprises a skirt carrying indicia that correspond to the control positions of the selector switch 230 and that cooperate with an associated index marker 234. Specifically, the skirt of the dial 232 carries the indicia "off," "bake," "broil" and "timed bake" disposed angularly thereabout. The switch drum 235 carries contacts C11 and C12, C21 and C22, C31, C41, C51, C61 and C62, C71 and C81, disposed angularly thereabout and respectively cooperating with stationary switch springs S1 to S8, inclusive, in the usual drum-controller array.

The power control circuit 240 includes a first solid state avalanche voltage break-down device 241 having power terminals 242 and 243, a second solid state avalanche voltage break-down device 244 having power terminals 245 and 246, and a pulse transformer 290 having a primary winding 291 and a first secondary winding 292 associated with the valve device 241 and a second secondary winding 293 associated with the second valve device 244. More specifically, the power terminal 243 of the first break-down device 241 is connected to one terminal of the secondary winding 292, and the other terminal of the secondary winding 292 is connected by a conductor 248 to an output terminal 249; whereas the power terminal 246 of the second break-down device 244 is connected by a conductor 250 to one terminal of the secondary winding 293 and the other terminal of the secondary winding 293 is connected by a conductor 251 to an output terminal 252.

In the circuit network, the contacts C11 and C12 and C81 terminate a conductor 266 which is connected to one of the terminals of the switch contacts 222 of the oven timer 220, the other terminal of the switch contacts 221 being connected to the line conductor L2; the contacts C21 and C22 and C31 terminate the line conductor L1; the contact C41 terminates a conductor 267 which is also connected to one terminal of the switch contacts 223 of the oven timer 220; the contact C51 terminates the neutral conductor N; the contacts C61 and C62 terminate a conductor 275 which is connected to the output terminal 252 of the power control circuit 240 and is also connected to one of the terminals of the lower heating unit RB in the oven 200; the contact C71 terminates a conductor 276 which is connected to the output terminal 249 of the temperature control circuit 240 and also to one terminal of the top heating unit RT in the oven 200.

The switch spring S1 is connected by a conductor 262 to one of the terminals of the switch contacts 255 on the oven controller 210; the switch spring S2 terminates a conductor 264 which is also connected to the power terminal 245 of the second break-down device 244 in the power control circuit 240 and is further connected to the input terminal 101 of the electronic control circuit 100; the switch spring S3 terminates a conductor 261 which is also connected to the power terminal 242 of the first break-down device 241 in the power control circuit 240; the switch springs S4 and S8 commonly terminate a conductor 261 which is connected to the other terminal of the top heating unit RT in the oven 200; the switch spring S5 terminates a conductor 268 which is connected to the other terminal of the switch contacts 223 in the oven timer 220; and the switch springs S6 and S7 commonly terminate a conductor 274 which is connected to the input terminal 104 of the control circuit 100.

The other terminal of the bottom heating unit RB is connected by a conductor 263 to the stationary switch spring 257 in the switch 255, the movable switch spring 256 contacting the cam 215 and serving to open the switch springs 255 when riding against the cam surface 216 and otherwise closing the switch contacts 255. The wiper 217 in the oven controller 210 is connected by a conductor 272 to one of the terminals of the primary winding 291 of the pulse transformer 290 in the power control circuit 240 and also to the output terminal 108 in electronic control circuit 100; and one end of the resistor 218 is connected by a conductor 271 to the input terminal 119 of the electronic control circuit 100. There is provided in the oven 200 a temperature sensing unit including a temperature sensing resistor RT2 of the same general type and construction as the resistor RT1, and more particularly is formed of "Thermistor" material, and has the terminals thereof connected by the conductors 269 and 270 to the input terminals 116 and 117, respectively, of the electronic control circuit 100. The other terminal of the primary winding 291 of the pulse transformer 290 is connected by a conductor 273, to the output terminal 109 of the electronic control circuit.

Considering now the general mode of operation of the circuit network, when the selector switch 230 occupies its "off" position, all of the circuits are open. When the selector switch 230 occupies any one of its positions other than its "off" position, one or more of the various circuits described above is energized. Specifically, when the cook sets the dial 232 of the selector switch 10 into its "bake" position, she also sets the dial 212 of the oven controller 210 into a temperature setting corresponding to that at which the baking operation is to be carried out. A circuit is completed from the line conductor L1 through the bake heating unit RB to the line conductor L2, and a circuit is completed from the line conductor L1 through the broil heating unit RT to the neutral conductor N.

More specifically, and referring to FIGS 5 and 6, a circuit is completed from the line conductor L1 through the contact C21, the switch spring S2, the conductor 264, the power control circuit 240 including the break-down device 244 and the transformer secondary winding 293 to the conductor 275, and to one terminal of the bake heating unit RB; from the other terminal of the bake heating unit RB through the conductor 263, the closed switch contacts 255, the conductor 262, the switch spring S1, the contact C11, the conductor 266 and the closed switch contacts 222 to the line conductor L2; whereby to apply the full operating potential between the line conductors L1 and L2 to the terminals of the bake heating unit RB. A second circuit is established from the line conductor L1 through the contact C31, the switch spring S3, the conductor 265, the power control circuit 240 including the break-down device 241 and the transformer secondary winding 292 to the conductor 276 and one terminal of the broil heating unit RT; from the other terminal of the broil heating unit RT through the conductor 261, the switch spring S4, the contact C41, the conductor 267, the closed switch contacts 223, the conductor 268, the switch springs S5 and the contact C51 to the neutral conductor N; whereby to apply the potential between the line conductor L1 and the neutral conductor N to the terminals of the broil heating unit RT. A further circuit is completed from the conductor 275 through the contact C61, the switch S6 and the conductor 274 to provide a connection between the electronic control circuit 100 and the power control circuit 240.

Assuming that the oven 200 is cold, the temperature difference between the temperature sensed by the resistor RT2 and the temperature setting of the manual dial 212 will be substantial, and the control signals appearing on the output terminals 108 and 109 thereof and applied via the conductors 272 and 273, respectively, to the pulse transformer primary winding 291 will create pulses in the secondary windings 292 and 293 early in each power half cycle, whereby to render the break-down devices 241 and 244 conductive early in each power cycle to supply substantially full available operating power respectively to the top heating unit RT and the bottom heating unit RB. As the temperature within the oven 200 rises to that set by the dial 212, the control signal voltages from the electronic control circuit 100 will occur later in each corresponding power half cycle, thereby to render the break-down devices 241 and 244 conductive later in each power half cycle and thus to supply less power to the heating units RT and RB respectively. Eventually, the break-down devices 241 and 244 will be operated in a manner such as merely to maintain the temperature of the oven 200 at that selected by the manual operation of the oven controller 210 and particularly the dial 212 thereof.

Should the cook set the manual dial 232 to the "broil" position and set the oven controller 210 and particularly the dial 212 thereof to the "broil" position, a circuit is completed for the broil heating unit RT only across the line conductors L1 and L2. More specifically, a circuit is completed from the line conductor L1 through the contact C31, the switch spring S3, the conductor 265, and the power control circuit 240 including the break-down device 241 and the secondary winding 292 to the conductor 276 connecting with one terminal of the broil heating unit RT; from the other terminal of the broil heating unit RT through the conductor 261, the switch spring S8, the contact C81, the conductor 266 and the closed switch contacts 222 to the line conductor L2. A further control circuit is established from the conductor 276 through the contact C71, the switch spring S7 and the conductor 274 to the electronic control circuit 100. Assuming that the oven 200 is cool, the temperature difference between the temperature sensed by the resistor RT2 and the temperature set by the oven controller 210 in its "broil" position (namely about 600° F.) will be substantial, and the control circuit 100 will operate to provide control signal voltages at the output terminals 108 and 109 thereof early in each power half cycle, these signal voltages being applied via the conductors 272 and 273 to the power control circuit 240 and particularly the primary of the pulse transformer 290 will cause conduction of the break-down device 241 early in each power half cycle so as to supply substantially full available power to the top or broil heating unit RT. As the temperature within the oven 200 gradually approaches 600° F., the control signal voltages from the electronic control circuit 100 will appear at the output terminals 108 and 109 thereof progressively later during each corresponding power half cycle and therefore the break-down device 241 will conduct later in the corresponding power half cycles and correspondingly less power will be supplied to the broil heating unit RT. Eventually, only a sufficient portion of each power half cycle will be applied to the broil heating unit RT to maintain the temperature within the oven 200 at about 600° F.

In order to carry out a "timed bake" operation in the oven 200, the cook sets the "time-to-stop" knob K1 and the "time-to-start" knob K2 on the oven timer 220, sets the dial 231 of the selector switch 230 into its "timed bake" position, and sets the dial 212 of the oven controller 210 into the desired bake temperature position. In its "timed bake" position, the selector switch 230 prepares a circuit for energizing only the bake heating unit RB across the line conductors L1 and L2; which circuit mentioned is initially closed and later opened by the main contacts 222 of the oven timer 220 at proper start and stop clock times as preset by the setting of the knobs K1 and K2. More specifically, the manual knob K1 is set to a desired "time-to-stop" position such as, for example, 6:00 p.m., if the clock time on the clock 221 is 3:00 p.m. The manual knob K2 is then set out of its "manual" position and into one of its variable time interval positions, such as one and one-half hours to bake. When the knob K2 is set out of its "manual" position, the switch contacts on the oven timer 220 move from the normal position illustrated in FIG. 5 to the actuated position wherein the switch contacts 222 and 223 are open. No heating circuit will be energized at this time, but at 4:30 p.m., i.e., one and one-half hours preceding 6:00 p.m. set by the knob K2, the oven timer 220 operates to move the various contacts thereof to the normal position, whereby to close the contacts 222 and 223.

Upon the closure of the switch contacts 222 and 223, a circuit is now completed for the "bake" heating unit RB as follows: from the line conductor L1 through the contacts C22, the switch spring S2, the conductor 264, the power control circuit 240 including the break-down device 244 and the transformer secondary winding 293, and the conductor 275 to one terminal of the bake heating unit RB; from the other terminal of the bake heating unit RB through the conductor 263, the closed switch contacts 255, the conductor 262, the switch spring S1, the contact C12, the conductor 266 and the closed contacts 222 to the line conductor L2.

A control circuit further is completed from the conductor 275 through the contact C62, the switch spring S6 and the conductor 274 to the terminal 104 of the control circuit 100. Assuming that the oven 200 is cool at the beginning of the timed bake operation, the temperature difference between the temperature sensed by the resistor RT2 and the temperature set by the oven controller 210 will be large and, accordingly, the electronic control circuit 100 operates to produce output signal voltages therefrom early in each corresponding power half cycle, which signal voltages are fed from the output terminals 108 and 109 via the conductors 272 and 273 to the pulse transformer primary winding 291. Accordingly, the avalanche voltage is applied to the break-down device 244 early in each corresponding power half cycle to render the device 244 conductive to apply substantially full power to the bake heating unit RB. As the temperature within the oven 200 approaches that set by the oven controller 210, the signal voltages from the control circuit 100 will occur later in each corresponding power half cycle thus to render the break-down device 244 conductive later in each corresponding power half cycle and, accordingly, to provide less power to the bake heating unit RB. Eventually only sufficient power is provided through the break-down device 244 to maintain the temperature within the oven 200 at the temperature set by the oven controller 210.

The "timed bake" operation continues until the clock time-to-stop set by the control knob K1, for example 6:00 p.m., at which time the oven timer 220 operates to open the contacts 222 and 223, such opening of the contacts 222 and 223 interrupting the circuits for supplying power to the bake heating unit RB. The cook at some subsequent time will remove the contents from the oven 200, will move the selector switch 230 to its "off" position and return the knob K2 of the oven timer 220 to the "manual" position thereof which will return the oven timer 220 to the normal position, i.e., with the contacts 222 and 223 closed as illustrated in FIG. 5.

In view of the foregoing, it will be seen that there has been provided an improved electric heating system having improved circuit networks including avalanche voltage break-down devices therein for selectively establishing within a relatively wide temperature range the cooking temperature of a medium heated thereby. More specifically, there has been provided in a heating unit of the hotplate type an improved control circuit and break-down device for use in circuit therewith so as selectively to control the electric power supplied to the hotplate in accordance with the desired cooking temperature as set by a manual controller and the temperature of the cooking vessel supported thereby as determined by a temperature sensing unit. The control circuit and the break-down devices of the present invention have also been illustrated applied to the control of the heating units in an oven so as to obtain continuous and selective control of the heat supplied to the oven over a wide range in all of the usual baking operations to be carried out therein including the usual bake and broil and timed bake operations.

While there have been described what are at present considered to be certain preferred embodiments of the invention, it will be understood that various modifications may be made therein, and it is intended to cover in the appended claims all such modifications that fall within the true spirit and scope of the invention.

What is claimed is:

1. In an electric heating system including an electric heating unit, a temperature sensing unit arranged to sense the temperature of a medium heated by said heating unit, a manually operable controller selectively operative to set different desired temperatures of the medium heated by said heating unit, and a source of electric power; the combination comprising a solid state avalanche voltage break-down device provided with a pair of power terminals and having non-conductive and conductive states between its power terminals, said device being characterized by a normally high impedance between its power terminals and a consequent non-conductive state and also characterized by a low impedance between its power terminals and a consequent conductive state in response to the application of a predetermined avalanche voltage across its power terminals and further characterized by a return to high impedance between its power terminals and a consequent non-conductive state in response to interruption of conduction between its power terminals, a control circuit governed jointly by said temperature sensing unit and by said controller and operative to produce a signal voltage in response to the difference between the temperature sensed by said temperature sensing unit and the temperature setting of said controller, a pulse circuit operatively interconnecting said control circuit and the power terminals of said device and driven by said signal voltage produced by said control circuit to impress said avalanche voltage across the power terminals of said device, means connecting the power terminals of said device and said heating unit to said source of electric power so that the power supplied to said heating unit is dependent upon the state of conduction of said device and so that the voltage applied across the power terminals of said device is below said predetermined avalanche voltage, and means for selectively interrupting conduction between the power terminals of said device in order to return said device to its normal non-conductive state.

2. The electric heating system combination set forth in claim 1, wherein said device is connected in series circuit with said heating unit.

3. The electric heating system combination set forth in claim 1, wherein said device is connected in parallel circuit with said heating unit.

4. In an electric heating system including an electric heating unit, a temperature sensing unit arranged to sense the temperature of a medium heating by said heating unit, a manually operable controller selectively operative to set different desired temperatures of the medium heated by said heating unit, and a source of electric power; the combination comprising a solid state avalanche voltage break-down device provided with a pair of power terminals and having non-conductive and conductive states between its power terminals, said device being characterized by a normally high impedance between its power terminals and a consequent non-conductive state and also characterized by a low impedance between its power terminals and a consequent conductive state in response to the application of a predetermined avalanche voltage across its power terminals and further characterized by a return to high impedance between its power terminals and a consequent non-conductive state in response to interruption of conduction between its power terminals, a control circuit governed jointly by said temperature sensing unit and by said controller and operative to produce a signal voltage in response to the difference between the temperature sensed by said temperature sensing unit and the temperature setting of said controller, a pulse transformer having a primary winding operatively connected to said control circuit and having a secondary winding operatively connected to the power terminals of said device, said signal voltage produced by said control circuit driving said pulse transformer to impress said avalanche voltage across the power terminals of said device, means connecting the power terminals of said device and said heating unit to said source of electric power so that the power supplied to said heating unit is dependent upon the state of conduction of said device and so that the voltage applied across the power terminals of said device is below said predetermined avalanche voltage, and means for selectively interrupting conduction between the power terminals of said device in order to return said device to its normal non-conductive state.

5. In an electric heating system including an electric heating unit, a temperature sensing unit arranged to sense the temperature of a medium heating by said heating unit, a manually operable controller selectively operative to set different desired temperatures of the medium heated by said heating unit, and a source of electric power; the combination comprising a solid state avalance voltage break-down device provided with a pair of power terminals and having non-conductive and conductive states between its power terminals, said device being characterized by a normally high impedance between its power terminals and a consequent non-conductive state and also characterized by a low impedance between its power terminals and a consequent conductive state in response to the application of a predetermined avalanche voltage across its power terminals and further characterized by a return to high impedance between its power terminals and a consequent non-conductive state in response to interruption of conduction between its power terminals, a control circuit governed jointly by said temperature sensing unit and by said controller and operative to produce a signal voltage in response to the difference between the temperature sensed by said temperature sensing unit and the temperature setting of said controller, a pulse transformer having a primary winding operatively connected to said control circuit and having a secondary winding operatively connected to the power terminals of said device, said signal voltage produced by said control circuit driving said pulse transformer to impress said avalanche voltage across the power terminals of said device, means connecting the power terminals of said device and said heating unit to said source of electric power so that the power supplied to said heating unit is dependent upon the state of conduction of said device and so that the voltage applied across the power terminals of said device is below said predetermined avalanche voltage, and means for selectivley interrupting conduction between the power terminals of said device in order to return said device to its normal non-conductive state.

6. In an electric heating system including an electric heating unit, a temperature sensing unit arranged to sense the temperature of a medium heating by said heating unit, a manually operable controller selectively operative to set different desired temperatures of the medium heated by said heating unit, and a source of electric power; the combination comprising a solid state avalanche voltage break-down device provided with a pair of power terminals and having non-conductive and conductive states between its power terminals, said device being characterized by a normally high impedance between its power terminals and a consequent non-conductive state and also characterized by a low impedance between its power terminals and a consequent conductive state in response to the application of a predetermined avalanche voltage across its power terminals and further characterized by a return to high impedance between its power terminals and a consequent non-conductive state in response to interruption of conduction between its power terminals, a control circuit governed jointly by said temperature sensing unit and by said controller and operative to produce a signal voltage in response to the difference between the temperature sensed by said temperature sensing unit and the temperature setting of said controller, a pulse transformer having a primary winding operatively connected to said control circuit and having a secondary winding operatively connected to the power terminals of said device, said signal voltage produced by said control circuit driving said pulse transformer to impress said avalanche voltage across the power terminals of said device, means connecting the power terminals of said device and said secondary winding of said pulse transformer and said heating unit in series and to said source of electric power so that the power supplied to said heating unit is dependent upon the state of conduction of said device and so that the voltage applied across the power terminals of said device is below said predetermined avalanche voltage, and means for selectively interrupting conduction between the power terminals of said device in order to return said device to its normal non-conductive state.

7. In an electric heating system including an electric heating unit, a temperature sensing unit arranged to sense the temperature of a medium heated by said heating unit, a manually operable controller selectively operative to set different desired temperatures of the medium heated by said heating unit, and a source of alternating electric power; the combinations comprising a solid state avalanche voltage break-down device provided with a pair of power terminals and having non-conductive and conductive states between its power terminals, said device being characterized by a normally high impedance between its power terminals and a consequent non-conductive state and also characterized by a low impedance between its power terminals and a consequent conductive state in response to the application of a predetermined avalanche voltage across its power terminals and further characterized by a return to high impedance between its power terminals and a consequent non-conductive state in response to interruption of conduction between its power terminals, a control circuit governed jointly by said temperature sensing unit and by said controller and operative to produce a signal voltage in response to the difference between the temperature sensed by said temperature sensing unit and the temperature setting of said controller, a pulse circuit operatively interconnecting said control circuit and the power terminals of said device and driven by said signal voltage produced by said control circuit to impress said avalanche voltage across the power terminals of said device, and means connecting the power terminals of said device and said heating unit to said power source so that the power supplied to said heating unit is dependent upon the state of conduction of said device and so that the voltage applied across the power terminals of said device is below said predetermined avalanche voltage, the return of the alternating electric power to zero potential during a half cycle thereof interrupting conduction between the power terminals of said device in order to return said device to its normal non-conductive state.

8. In an electric heating system including an electric heating unit, a temperature sensing unit arranged to sense the temperature of a medium heated by said heating unit, a manually operable controller selectively operative to set different desired temperatures of the medium heated by said heating unit, and a source of alternating electric power; the combinations comprising a solid state avalanche voltage break-down device provided with a pair of power terminals and having non-conductive states between its power terminals, said device being characterized by a normally high impedance between its power terminals and a consequent non-conductive state and also characterized by a low impedance between its power terminals and a consequent conductive state in response to the application of a predetermined avalanche voltage across its power terminals and further characterized by a return to high impedance between its power terminals and a consequent non-conductive state in response to interruption of conduction between its power terminals, a control circuit operated from said power source and governed jointly by said temperature sensing unit and by said controller and operative to produce control signals having a predetermined time phase relationship to the corresponding half cycles of said power source in response to the difference between the temperature sensed by said temperature sensing unit and the temperature setting of said controller, a pulse circuit operatively interconnecting said control circuit and the power terminals of said device and driven by said control signals to impress said avalanche voltage across the power terminals of said device at the predetermined time phase relationship to the corresponding half cycles of said power source, and means connecting the power terminals of said device and said heating unit to said power source so that the power supplied to said heating unit is dependent upon the state of conduction of said device and so that the voltage applied across the power terminals of said device is below said predetermined avalanche voltage, said device conducting between the power terminals thereof for the time intervals between the application of the control signals to said pulse circuit and the consequent impressing of said avalanche voltage across the power terminals thereof and the end of the corresponding half cycles of said power source thereby to govern the power supplied to said heating unit, the return of the alternating electric power to zero potential during a half cycle thereof interrupting conduction between the power terminals of said device in order to return said device to its normal non-conductive state.

9. In an electric heating system including an electric heating unit, a temperature sensing unit arranged to sense the temperature of a medium heated by said heating unit, a manually operable controller selectively operative to set different desired temperatures of the medium heated by said heating unit, and a source of alternating electric power; the combinations comprising a solid state avalanche voltage break-down device provided with a pair of power terminals and having non-conductive and conductive states between its power terminals, said device being characterized by a normally high impedance between its power terminals and a consequent non-conductive state and also characterized by a low impedance between its power terminals and a consequent conductive state in response to the application of a predetermined avalanche voltage across its power terminals and further characterized by a return to high impedance between its power terminals and a consequent non-conductive state in response to interruption of conduction between its power terminals, a time delay circuit operated from said power source and governed jointly by said temperature sensing unit and by said controller and operative to produce first control signals having a predetermined time phase delay with respect to the corresponding half cycles of said power source that is inversely proportional to the difference between the temperature sensed by said temperature sensing unit and the temperature setting of said controller, a signal generating circuit operated by said time delay circuit and operative upon the application of the first control signals thereto to produce second control signals having a predetermined time phase delay with respect to the corresponding half cycles of said power source, a pulse circuit operatively interconnecting said signal generating circuit and the power terminals of said device and driven by said second control signals to impress said avalanche voltage across the power terminals of said device at the predetermined time phase relationship to the corresponding half cycles of said power source, and means connecting the power terminals of said device and said heating unit to said power source so that the power supplied to said heating unit is dependent upon the state of conduction of said device and so that the voltage applied across the power terminals of said device is below said predetermined avalanche voltage, said device being conductive between the power terminals thereof for the time intervals between the application of the second control signals to said pulse circuit and the consequent impressing of said avalanche voltage across the power terminals thereof and the end of the corresponding half cycles of said power source thereby to govern the power supplied to said heating unit, the return of the alternating electric power to zero potential during a half cycle thereof interrupting conduction between the power terminals of said device in order to return said device to its normal non-conductive state.

10. In an electric heating system including an electric heating unit, a temperature sensing unit arranged to sense the temperature of a medium heated by said heating unit, a manually operable controller selectively operative to set different desired temperatures of the medium heated by said heating unit, and a source of alternating electric power; the combinations comprising a solid state avalanche voltage break-down device provided with a pair of power terminals and having non-conductive and conductive states between its power terminals, said device being characterized by a normally high impedance between its power terminals and a consequent non-conductive state and also characterized by a low impedance between its power terminals and a consequent conductive state in response to the application of a predetermined avalanche voltage across its power terminals and further characterized by a return to high impedance between its power terminals and a consequent non-conductive state in response to interruption of conduction between its power terminals, a capacitor charging circuit including a charging capacitor and operated from said power source and having the charging rate thereof jointly governed by said temperature sensing unit and said controller and operative to charge said capacitor toward a predetermined potential at a rate that is proportional to the difference between the temperature sensed by said temperature sensing unit and the temperature setting of said controller, a discharge circuit for said capacitor including a breakdown device characterized by conduction therethrough in response to the application of a predetermined potential thereacross from said capacitor and operative upon conduction thereof to produce control signals having a predetermined time phase delay with respect to the corresponding half cycles of said power source that is inversely proportional to the difference between the temperature sensed by said temperature sensing unit and the temperature setting of said controller, a pulse circuit operatively interconnecting said discharge circuit and the power terminals of said device and driven by said control signals to impress said avalanche voltage across the power terminals of said device at the predetermined time phase relationship to the corresponding half cycles of said power source, and means connecting the power terminals of said device and said heating unit to said power source so that the power supplied to said heating unit is dependent upon the state of conduction of said device and so that the voltage applied across the power terminals of said device is below said predetermined avalanche voltage, said device conducting between the power terminals thereof for the time intervals between the application of the control signals to said pulse circuit and the consequent impressing of said avalanche voltage across the power terminals thereof and the end of the corresponding half cycles of said power source thereby to govern the power supplied to said heating unit, the return of the alternating electric power to zero potential during a half cycle thereof interrupting conduction between the power terminals of said device in order to return said device to its normal non-conducting state.

11. In an electric heating system including an electric heating unit, a temperature sensing unit arranged to sense the temperature of a medium heated by said heating unit, a manually operable controller selectively operative to set different desired temperatures of the medium heated by said heating unit, and a source of alternating electric power; the combinations comprising a solid state avalanche voltage break-down device provided with a pair of power terminals and having non-conductive and conductive states between its power terminals, said device being characterized by a normally high impedance between its power terminals and a consequent non-conductive state and also characterized by a low impedance between its power terminals and a consequent conductive state in response to the application of a predetermined avalanche voltage across its power terminals and further characterized by a return to high impedance between its power terminals and a consequent non-conductive state in response to interruption of conduction between its power terminals, a capacitor charging circuit including a charging capacitor having the charging rate thereof governed jointly by said temperature sensing unit and by said controller, a source of pulsating D.-C. voltage clipped to provide a constant maximum amplitude thereof connected as the charging potential for said charging circuit to cause said charging capacitor to charge toward a predetermined potential at a rate that is proportional to the difference between the temperature sensed by said temperature sensing unit and the temperature setting of said controller, a discharge circuit for said capacitor including a breakdown device characterized by conduction therethrough in response to the application of the predetermined potential thereacross from said capacitor and operative upon conduction thereof to produce control signals having a predetermined time phase delay with respect to the corresponding half cycles of the power source inversely proportional to the difference between the temperature sensed by said temperature sensing unit and the temperature setting of said controller, a pulse circuit operatively interconnecting said discharge circuit and the power terminals of said device and driven by said control signals to impress said avalanche voltage across the power terminals of said device at the predetermined time phase relationship to the corresponding half cycles of said power source, and means connecting the power terminals of said device and said heating unit to said power source so that the power supplied to said heating unit is dependent upon the state of conduction of said device and so that the voltage applied across the power terminals of said device is below said predetermined avalanche voltage, said device conducting between the power terminals thereof for the time intervals between the application of the control signals to said pulse circuit and the consequent impressing of said avalanche voltage across the power terminals thereof and the end of the corresponding half cycles of said power source thereby to govern the power supplied to said heating unit, the return of the alternating electric power to zero potential during a half cycle thereof interrupting conduction between the power terminals of said device in order to return said device to its normal non-conductive state.

12. In an electric heating system including an electric heating unit, a temperature sensing unit arranged to sense the temeprature of a medium heated by said heating unit, a manually operable controller selectively operative to set different desired temperatures of the medium heated by said heating unit, and a source of alternating electric power; the combinations comprising a solid state avalanche voltage break-down device provided with a pair of power terminals and having non-conductive and conductive states between its power terminals, said device being characterized by a normally high impedance between its power terminals and a consequent non-conductive state and also characterized by a low impedance between its power terminals and a consequent conductive state in response to the application of a predetermined avalanche voltage across its power terminals and further characterized by a return to high impedance between its power terminals and a consequent non-conductive state in response to interruption of conduction between its power terminals, a capacitor charging circuit including a charging capacitor and a variable impedance in the charging path therefor and governed jointly by said temperature sensing unit and by said controller and having an impedance inversely proportional to the difference between the temperature sensed by said temperature sensing unit and the temperature setting of said controller, a source of pulsating D.-C. potential clipped to provide a constant maximum amplitude thereof and connected as the charging potential for said charging circuit, a discharge circuit for said capacitor including a breakdown device characterized by conduction therethrough in response to the application of a predetermined potential thereacross from said capacitor and operative upon conduction thereof to produce control signals having a predetermined time phase delay with respect to the corresponding half cycles of said power source that is inversely proportional to the difference between the temperature sensed by said temperature sensing unit and the temperature setting of said controller, a pulse circuit operatively interconnecting said discharge circuit and the power terminals of said device and driven by said control signals to impress said avalanche voltage across the power terminals of said device at the predetermined time phase relationship to the corresponding half cycles of said power source, and means connecting the power terminals of said device and said heating unit to said power source so that the power supplied to said heating unit is dependent upon the state of conduction of said device and so that the voltage applied across the power terminals of said device is below said predetermined avalanche voltage, said device conducting between the power terminals thereof for the time intervals between the application of the control signals to said pulse circuit and the consequent impressing of said avalanche voltage across the power terminals thereof and the end of the corresponding half cycles of said power source thereby to govern the power supplied to said heating unit, the return of the alternating electric power to zero potential during a half cycle thereof interrupting conduction between the power terminals of said device in order to return said device to its normal non-conductive state.

13. In an electric heating system including an electric heating unit, a temperature sensing unit arranged to sense the temperature of a medium heated by said heating unit, a manually operable controller selectively operative to set different desired temperatures of the medium heated by said heating unit, and a source of alternating electric power; the combination comprising a solid state avalanche voltage break-down device provided with a pair of power terminals and having non-conductive and conductive states between its power terminals, said device being characterized by a normally high impedance between its power terminals and a consequent non-conductive state and also characterized by a low impedance between its power terminals and a consequent conductive state in response to the application of a predetermined avalanche voltage across its power terminals and further characterized by a return to high impedance between its power terminals and a consequent non-conductive state in response to interruption of conduction between its power terminals, a capacitor charging circuit operated from said power source and including a charging capacitor having a charging potential applied thereacross jointly governed by said temperature sensing unit and said controller and operative to charge said capacitor toward a predetermined potential at a rate that is proportional to the difference between the temperature sensed by said temperature sensing and the temperature setting of said controller, a discharge circuit for said capacitor including a breakdown device characterized by conduction therethrough in response to the application of a predetermined potential thereacross from said capacitor and operative upon conduction thereof to produce control signals having a predetermined time phase delay with respect to the corresponding half cycles of said power source that is inversely proportional to the difference between the temperature sensed by said temperature sensing unit and the temperature setting of said controller, a pulse circuit operatively interconnecting said discharge circuit and the power terminals of said device and driven by said control signals to impress said avalanche voltage across the power terminals of said device at the predetermined time phase relationship to the corresponding half cycles of said power source, and means connecting the power terminals of said device and said heating unit to said power source so that the power supplied to said heating unit is dependent upon the state of conduction of said device and so that the voltage applied across the power terminals of said device is below said predetermined avalanche voltage, said device conducting between the power terminals thereof for the time intervals between the application of the control signals to said pulse circuit and the consequent impressing of said avalanche voltage across the power terminals thereof and the end of the corresponding half cycles of said power source thereby to govern the power supplied to said heating unit, the return of the alternating electric power to zero potential during a half cycle thereof interrupting conduction between the power terminals of said device in order to return said device to its normal non-conductive state.

14. In an electric heating system including an electric heating unit, a temperature sensing resistor operatively associated with the medium heated by said heating unit and having a high temperature coefficient of resistance so that the resistance of said temperature sensing resistor is selectively variable in accordance with the temperature of the medium heated, a variable resistor controlled by a manually operable controller selectively operative to said different desired temperatures of the medium heated by said heating unit, and a source of alternating electric power; the combinations comprising a solid state avalanche voltage break-down device provided with a pair of power terminals and having non-conductive and conductive states between its power terminals, said device being characterized by a normally high impedance between its power terminals and a consequent non-conductive state and also characterized by a low impedance between its power terminals and a consequent conductive state in response to the application of a predetermined avalanche voltage across its power terminals and further characterized by a return to high impedance between its power terminals and a consequent non-conductive state in response to interruption of conduction between its power terminals, a voltage divider network operated from said power source and including said temperature sensing resistor and said variable resistor in series, a charging capacitor operated by a portion of said voltage divider network including said temperature sensing resistor for charging said capacitor at a rate that is proportional to the difference between the temperature sensed by said temperature sensing resistor and the temperature setting of said variable resistor, a discharge circuit for said capacitor including a breakdown device characterized by conduction therethrough in response to the application of a predetermined potential thereacross from said capacitor and operative upon conduction thereof to produce control signals having a predetermined time phase delay with respect to the corresponding half cycles of said power source that is inversely proportional to the difference between the temperature sensed by said temperature sensing resistor and the temperature setting of said variable resistor, a pulse circuit operatively interconnecting said discharge circuit and the power terminals of said device and driven by said control signals to impress said avalanche voltage across the power terminals of said device at the predetermined time phase relationship to the corresponding half cycles of said power source, and means connecting the power terminals of said device and said heating unit to said power source so that the power supplied to said heating unit is dependent upon the state of conduction of said device and so that the voltage applied across the power terminals of said device is below said predetermined avalanche voltage, said device conducting between the power terminals thereof for the time intervals between the application of the control signals to said pulse circuit and the consequent impressing of said avalanche voltage across the power terminals thereof and the end of the corresponding half cycles of said power source thereby to govern the power supplied to said heating unit, the return of the alternating electric power to zero potential during a half cycle thereof interrupting conduction between the power terminals of said device in order to return said device to its normal non-conductive state.

15. In an electric oven, a first electric heating unit operatively associated with said oven, a second electric heating unit operatively associated with said oven, a temperature sensing unit arranged to sense the temperature in said oven, a manually operable controller selectively operative to set different desired temperatures in said oven, a manually settable oven selector having a plurality of operative positions, a source of electric power, a first solid state avalanche voltage break-down device provided with a first pair of power terminals and having non-conductive and conductive states between its power terminals, a second solid state avalanche voltage breakdown device provided with a second pair of power terminals and having non-conductive and conductive states between its power terminals, said devices being characterized by a normally high impedance between the power terminals thereof and a consequent non-conductive state and also characterized by a low impedance between the power terminals thereof and a consequent conductive state in response to the application of a predetermined avalanche voltage across the power terminals thereof and further characterized by a return to high impedance between the power terminals thereof and a consequent non-conductive state in response to interruption of conduction between the power terminals thereof, a control circuit governed jointly by said temperature sensing unit and by said controller and operative to produce a signal voltage in response to the difference between the temperature sensed by said temperature sensing unit and the temperature setting of said controller, a pulse circuit operatively interconnecting said control circuit and the power terminals of said device and driven by said signal voltage produced by said control circuit to impress said avalanche voltage across the power terminals of said devices, means governed by said oven selector in the various operative positions thereof for selectively connecting the power terminals of said devices and said heating units to said power source so that the power supplied to said heating units is dependent upon the state of conduction of said devices and so that the voltage applied across the power terminals of said devices is below said predetermined avalanche voltage, and means for selectively interrupting conduction between the power terminals of said devices in order to return said devices to the normal non-conductive state thereof.

16. In an electric oven, a first electric heating unit operatively associated with said oven, a second electric heating unit operatively associated with said oven, a temperature sensing unit arranged to sense the temperature in said oven, a manually operable controller selectively operative to set different desired temperatures in said oven, a manually settable oven controller having a "bake" position and a "broil" position, a source of alternating electric power, a first solid state avalanche voltage break-down device provided with a first pair of power terminals and having non-conductive and conductive states between its power terminals, a second solid state avalanche voltage break-down device provided with a second pair of power terminals and having non-conductive and conductive states between its power terminals, said devices being characterized by a normally high impedance between the power terminals thereof and a consequent non-conductive state and also characterized by a low impedance between the power terminals thereof and a consequent conductive state in response to the application of a predetermined avalanche voltage across the power terminals thereof and further characterized by a return to high impedance between the power terminals thereof and a consequent non-conductive state in response to interruption of conduction between the power terminals thereof, a control circuit governed jointly by said temperature sensing unit and by said controller and operative to produce a signal voltage in response to the difference between the temperature sensed by said temperature sensing unit and the temperature setting of said controller, a pulse circuit operatively interconnecting said control circuit and the power terminals of said device and driven by said signal voltage produced by said control circuit to impress said avalanche voltage across the power terminals of said devices, means governed by said oven selector in the "bake" position thereof for selectively connecting the power terminals of said first device and said first heating unit to said source and for selectively connecting the power terminals of said second device and said second heating unit to said source so that the power supplied to said heating units is dependent upon the state of conduction respectively of said devices for the bake purpose and so that the voltage applied across the power terminals of said devices is below said predetermined avalanche voltage, and means governed by said oven selector in the "broil" position thereof for selectively connecting the power terminals of said second device and said second heating unit to said source so that the power supplied to said second heating unit is dependent upon the state of conduction of said second device for the broil purpose and so that the voltage applied across the power terminals of said second device is below said predetermined avalanche voltage, the return of the alternating electric power to zero potential during a half cycle thereof interrupting conduction between the power terminals of said devices in order to return said devices to the normal non-conductive state thereof.

17. In an electric oven, a first electric heating unit operatively associated with said oven, a second electric heating unit operatively associated with said oven, a temperature sensing unit arranged to sense the temperature in said oven, a manually operable controlled selectively operative to set different desired temperatures in said oven, a manually settable clock-controlled oven timer having first and second control positions, said oven timer being operative from its first control position into its second control position at the clock time of setting thereof and operative from its second control position back into its first control position at the clock time of the beginning of the set time interval and operative from its first control position back into its second control position at the clock time of the end of the time set interval, a manually settable oven selector having a "bake" position and a "timed-bake" position, a source of alternating electric power, a first solid state avalanche voltage break-down device provided with a first pair of power terminals and having non-conductive and conductive states between its power terminals, a second solid state avalanche voltage break-down device provided with a second pair of power terminals and having non-conductive and conductive states between its power terminals, said devices being characterized by a normally high impedance between the power terminals thereof and a consequent non-conductive state and also characterized by a low impedance between the power terminals thereof and a consequent conductive state in response to the application of a predetermined avalanche voltage across the power terminals thereof and further characterized by a return to high impedance between the power terminals thereof and a consequent non-conductive state in response to interruption of conduction between the power terminals thereof, and means governed jointly by said oven selector in its "timed bake" position and said oven timer in its first control position for connecting the power terminals of said first device and said first heating unit to said source so that the power supplied to said first heating unit is dependent upon the state of conduction of said first device for the timed bake purpose and so that the voltage applied across the power terminals of said first device is below said predetermined avalanche voltage, the return of the alternating power to zero potential during a half cycle thereof interrupting conduction between the power terminals of said devices in order to return said devices to the normal non-conductive state thereof.

18. In an electric oven, a first electric heating unit operatively associated with said oven, a second electric heating unit operatively associated with said oven, a temperature sensing unit arranged to sense the temperature in said oven, a manually operable controller selectively operative to set different desired temperatures in said oven, a manually settable clock-controlled oven timer having first and second control positions, said oven timer being operative from its first control position into its second control position at the clock time of setting thereof and operative from its second control position back into its first control position at the clock time of the beginning of the set time interval and operative from its first control position back into its second control position at the clock time of the end of the time set interval, a manually settable oven selector having a "bake" position and a "broil" position and a "timed-bake" position, a source of alternating electric power, a first solid state avalanche voltage breakdown device provided with a first pair of power terminals and having non-conductive and conductive states between its power terminals, a second solid state avalanche voltage break-down device provided with a second pair of power terminals and having non-conductive and conductive states between its power terminals, said devices being characterized by a normally high impedance between the power terminals thereof and a consequent non-conductive state and also characterized by a low impedance between the power terminals thereof and a consequent conductive state in response to the application of a predeterminad avalanche voltage across the power terminals thereof and further characterized by a return to high impedance between the power terminals thereof and a consequent non-conductive state in response to interruption of conduction between the power terminals thereof, a control circuit governed jointly by said temperature sensing unit and by said controller and operative to produce a signal voltage in response to the difference between the temperature sensed by said temperature sensing unit and the temperature setting of said controller, a pulse circuit operatively interconnecting said control circuit and the power terminals of said devices and driven by said signal voltage produced by said control circuit to impress said avalanche voltage across the power terminals of said devices, means governed by said oven selector in the "bake" position thereof for selectively connecting the power terminals of said first device and said first heating unit to said source and for selectively connecting the power terminals of said second device and said second heating unit to said source so that the power supplied to said heating units is dependent upon the state of conduction respectively of said devices for the bake purpose and so that the voltage applied across the power terminals of said devices is below said predetermined avalanche voltage, means governed by said oven selector in the "broil" position thereof for selectively connecting the power terminals of said second device and said second heating unit to said source so that the power supplied to said second heating unit is dependent upon the state of conduction of said second device for the broil purpose and so that the voltage applied across the power terminals of said second device is below said predetermined avalanche voltage, and means governed jointly by said oven selector in its "timed-bake" position and said oven timer in its first control position for connecting the power terminals of said first device and said first heating unit to said source so that the power supplied to said first heating unit is dependent upon the state of conduction of said first device for the "timed-bake" purpose and so that the voltage applied across the power terminals of said first device is below said predetermined avalanche voltage, the return of the alternating electric power to zero potential during a half cycle thereof interrupting conduction between the power terminals of said devices in order to return said devices to the normal non-conductive state thereof.

19. In an electric oven, a first electric heating unit operatively associated with said oven, a second electric heating unit operatively associated with said oven, a temperature sensing unit arranged to sense the temperature in said oven, a manually operable controller selectively operative to set different desired temperatures in said oven, a manually settable oven selector having a plurality of operative positions, a 3-wire Edison source of electric power including a first line conductor and a second line conductor and a neutral conductor, a first solid state avalanche voltage break-down device provided with a first pair of power terminals, a second solid state avalanche voltage break-down device provided with a second pair of power terminals and having non-conductive and conductive states between its power terminals, said devices being characterized by a normally high impedance between the power terminals thereof and a consequent non-conductive state and also characterized by a low impedance between the power terminals thereof and a consequent conductive state in response to the application of a predetermined avalanche voltage across the power terminals thereof and further characterized by a return to high impedance between the power terminals thereof and a consequent non-conductive state in response to interruption of conduction between the power terminals thereof, a control circuit governed jointly by said temperature sensing unit and by said controller and operative to produce a signal voltage in response to the difference between the temperature sensed by said temperature sensing unit and the temperature setting of said controller, a pulse circuit operatively interconnecting said control circuit and the power terminals of said devices and driven by said signal voltage produced by said control circuit to impress said avalanche voltage across the power terminals of said devices, and means governed by said oven selector in the various operative positions thereof for selectively connecting the power terminals of said first device in series with said first heating unit and to a selected pair of said conductors so that the power supplied to said first heating unit is depedent upon the state of conduction of said first device and for selectively connecting the power terminals of said second device in series with said second heating unit to a selected pair of said conductors so that the power supplied to said second heating unit is dependent upon the state of conduction of said second device and so that the voltage applied across the power terminals of said devices is below said predetermined avalanche voltage, the return of the alternating electric power to zero potential during a half cycle thereof interrupting conduction between the power terminals of said devices in order to return said devices to the normal non-conductive state thereof.

20. In an electric oven, a first electric heating unit operatively associated with said oven, a second electric heating unit operatively associated with said oven, a temperature sensing unit arranged to sense the temperature in said oven, a manually operable controller selectively operative to set different desired temperatures in said oven, a manually settable oven controller having a "bake" position and a "broil" position, a 3-wire Edison source of electric power including a first line conductor and a second line conductor and a neutral conductor, a first solid state avalanche voltage break-down device provided with a first pair of power terminals and having non-conductive and conductive states between its power terminals, a second solid state avalanche voltage break-down device provided with a second pair of power terminals and having non-conductive and conductive states between its power terminals, said devices being characterized by a normally high impedance between the power terminals thereof and a consequent non-conductive state and also characterized by a low impedance between the power terminals thereof and a consequent conductive state in response to the application of a predetermined avalanche voltage across the power terminals thereof and further characterized by return to high impedance between the power terminals thereof and a consequent non-conductive state in response to interruption of conduction between the power terminals thereof, a control circuit governed jointly by said temperature sensing unit and by said controller and operative to produce a signal voltage in response to the difference between the temperature sensed by said temperature sensing unit and the temperature setting of said controller, a pulse circuit operatively interconnecting said control circuit and the power terminals of said devices and driven by said signal voltage produced by said control circuit to impress said avalanche voltage across the power terminals of said devices, means governed by said oven selector in the "bake" position thereof for selectively connecting the power terminals of said first device in series with said first heating unit and to said first and second line conductors so that the power supplied to said first heating unit is dependent upon the state of conduction of said first device and for selectively connecting the power terminals of said second device in series with said second heating unit to one of said line conductors and said neutral conductor so that the power supplied to said second heating unit is dependent upon the state of conduction of said second device for the bake purpose and so that the power applied across the power terminals of said devices is below said predetermined avalanche voltage, and means governed by said oven selector in the "broil" position thereof for selectively connecting the power terminals of said second device in series with said second heating unit and to said line conductors so that the power supplied to said second heating unit is dependent upon the state of conduction of said second device for the broil purpose and so that the voltage applied across the power terminals of said second device is below said predetermined avalanche voltage, the return of the alternating electric power to zero potential during a half cycle thereof interrupting conduction between the power terminals of said devices in order to return said devices to the normal non-conductive state thereof.

21. In an electric oven, a first electric heating unit operatively associated with said oven, a second electric heating unit operatively associated with said oven, a temperature sensing unit arranged to sense the temperature in said oven, a manually operable controller selectively operative to set different desired temperatures in said oven, a manually settable clock-controlled oven timer having first and second control positions, said oven timer being operative from its first control position into its second control position at the clock time of setting thereof and operative from its second control position back into its first control position at the clock time of the beginning of the set time interval and operative from its first control position back into its second control position at the clock time of the end of the time set interval, a manually settable oven selector having a "bake" position and a "timed-bake" position, a 3-wire Edison source of electric power including a first line conductor and a second line conductor and a neutral conductor, a first solid state avalanche voltage break-down device provided with a first pair of power terminals and having non-conductive and conductive states between its power terminals, a second solid state avalanche voltage break-down device provided with a second pair of power terminals and having a non-conductive and conductive state between its power terminals, said devices being characterized by a normally high impedance between the power terminals thereof and a consequent non-conductive state and also characterized by a low impedance between the power terminals thereof and a consequent conductive state in response to the application of a predetermined avalanche voltage across the power terminals thereof and further characterized by a return to high impedance between the power terminals thereof and a consequent non-conductive state in response to interruption of conduction between the power terminals thereof, a control circuit governed jointly by said temperature sensing unit and by said controller and operative to produce a signal voltage in response to the difference between the temperature sensed by said temperature sensing unit and the temperature setting of said controller, a pulse circuit operatively interconnecting said control circuit and the power terminals of said devices and driven by said signal voltage produced by said control circuit to impress said avalanche voltage across the power terminals of said devices, means governed by said oven selector in the "bake" position thereof for selectively connecting the power terminals of said first device in series with said first heating unit and to said first and second line conductors so that the power supplied to said first heating unit is dependent upon the state of conduction of said first device and for selectively connecting the power terminals of said second device in series with said second heating unit to one of said line conductors and said neutral conductor so that the power supplied to said second heating unit is dependent upon the state of conduction of said second device for the bake purpose and so that the power applied across the power terminals of said device is below said predetermined avalanche voltage, and means governed jointly by said oven selector in its "timed bake" position and said oven timer in its first control position for connecting the power terminals of said first device in series with said first heating unit and to said line conductors so that the power supplied to said first heating unit is dependent upon the state of conduction of said first device for the timed bake purpose so that the voltage across the power terminals of said first device is below said predetermined avalanche voltage, the return of the alternating electric power to zero potential during a half cycle thereof interrupting conduction between the power terminals of said devices in order to return said devices to the normal non-conductive state thereof.

22. In an electric oven, a first electric heating unit operatively associated with said oven, a second electric heating unit operatively associated with said oven, a temperature sensing unit arranged to sense the temperature in said oven, a manually operable controller selectively operative to set different desired temperatures in said oven, a manually settable clock-controlled oven timer having first and second control positions, said oven timer being operative from its first control position into its second control position at the clock time of setting thereof and operative from its second control position back into its first control position at the clock time of the beginning of the set time interval and operative from its first control position back into its second control position at the clock time of the end of the time set interval, a manually settable oven selector having a "bake" position and a "broil" position and a "timed bake" position, a 3-wire Edison source of electric power including a first line conductor and a second line conductor and a neutral conductor, a first solid state avalanche voltage break-down device provided with a first pair of power terminals and having non-conductive and conductive states between its power terminals, a second solid state avalanche voltage break-down device provided with a second pair of power terminals and having non-conductive and conductive states between its power terminals, said devices being characterized by a normally high impedance between the power terminals thereof and a consequent non-conductive state and also characterized by a low impedance between the power terminals thereof and a consequent conductive state in response to the application of a predetermined avalanche voltage across the power terminals thereof and further characterized by a return to high impedance between the power terminals thereof and a consequent non-conductive state in response to interruption of conduction between the power terminals thereof, a control circuit governed jointly by said temperature sensing unit and by said controller and operative to produce a signal voltage in response to the difference between the temperature sensed by said temperature sensing unit and the temperature setting of said controller, a pulse circuit operatively interconnecting said control circuit and the power terminals of said devices and driven by said signal voltage produced by said control circuit to impress said avalanche voltage across the power terminals of said devices, means governed by said oven selector in the "bake" position thereof for selectively connecting the power terminals of said first device in series with said first heating unit and to said first and second line conductors so that the power supplied to said first heating unit is dependent upon the state of conduction of said first device and for selectively connecting the power terminals of said second device in series with said second heating unit to one of said line conductors and said neutral conductor so that the power supplied to said second heating unit is dependent upon the state of conduction of said second device for the bake purpose and so that the power applied across the power terminals of said devices is below said predetermined avalanche voltage, means governed by said oven selector in the "broil" position thereof for selectively connecting the power terminals of said second device in series with said second heating unit and to said line conductors so that the power supplied to said second heating unit is dependent upon the state of conduction of said second device for the broil purpose and so that the voltage applied across the power terminals of said second device is below said predetermined avalanche voltage, and means governed jointly by said oven selector in its "timed bake" position and said oven timer in its first control position for connecting the power terminals of said first device in series with said first heating unit and to said line conductors so that the power supplied to said first heating unit is dependent upon the state of conduction of said first device for the timed bake purpose and so that the voltage across the power terminals of said first device is below said predetermined avalanche voltage, the return of the alternating electric power to zero potential during a half cycle thereof interrupting conduction between the power terminals of said devices in order to return said devices to the normal non-conductive state thereof.

References Cited by the Examiner
UNITED STATES PATENTS

| | | | |
|---|---|---|---|
| 2,591,849 | 4/1952 | McDowell | 219—489 |
| 3,018,356 | 1/1962 | Busch et al. | 219—489 |
| 3,051,813 | 8/1962 | Busch et al. | 219—489 |
| 3,062,943 | 11/1962 | Euler | 219—489 |

RICHARD M. WOOD, *Primary Examiner.*